United States Patent
Kornaros et al.

(10) Patent No.: US 11,637,456 B2
(45) Date of Patent: Apr. 25, 2023

(54) NEAR-FIELD ANTENNAS FOR ACCUMULATING RADIO FREQUENCY ENERGY AT DIFFERENT RESPECTIVE SEGMENTS INCLUDED IN ONE OR MORE CHANNELS OF A CONDUCTIVE PLATE

(71) Applicant: Energous Corporation, San Jose, CA (US)

(72) Inventors: Evangelos Kornaros, Santa Cruz, CA (US); Saman Kabiri, Aliso Viejo, CA (US); Alister Hosseini, Phoenix, AZ (US); Chryssoula Kyriazidou, San Jose, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 17/667,407

(22) Filed: Feb. 8, 2022

(65) Prior Publication Data

US 2022/0302593 A1 Sep. 22, 2022

Related U.S. Application Data

(63) Continuation of application No. 16/718,060, filed on Dec. 17, 2019, now Pat. No. 11,245,191, which is a
(Continued)

(51) Int. Cl.
*H02J 50/23* (2016.01)
*H01Q 9/04* (2006.01)
(Continued)

(52) U.S. Cl.
CPC ............ *H02J 50/23* (2016.02); *H01Q 1/38* (2013.01); *H01Q 9/0414* (2013.01); *H02J 50/12* (2016.02);
(Continued)

(58) Field of Classification Search
CPC . B60L 53/12; H02J 5/005; H02J 50/00; H02J 50/10; H02J 50/12; H02J 50/23;
(Continued)

(56) References Cited

U.S. PATENT DOCUMENTS

| 787,412 A | 4/1905 | Tesla |
| 3,167,775 A | 1/1965 | Guertler |

(Continued)

FOREIGN PATENT DOCUMENTS

| CN | 1829999 A | 9/2006 |
| CN | 101465471 A | 6/2009 |

(Continued)

OTHER PUBLICATIONS

Energous Corp., IPRP, PCT/US2014/037072, Nov. 10, 2015, 6 pgs.
(Continued)

*Primary Examiner* — Binh B Tran
(74) *Attorney, Agent, or Firm* — Morgan, Lewis & Bockius LLP

(57) ABSTRACT

Near-field antennas and methods of operating and manufacturing near-field antennas are provided herein. An example near-field antenna for transmitting radio frequency (RF) power transmission signals includes: (i) a conductive plate including one or more channels extending through the conductive place, a respective channel of the one or more channels having first and second segments, and (ii) a feed element configured to direct a plurality of RF power transmission signals towards the conductive plate. At least some of the RF power transmission signals cause an accumulation of RF energy within a near-field distance of the conductive plate. Furthermore, the accumulation of RF energy includes: (i) a first zone of accumulated RF energy at the first segment, and (ii) a second zone of accumulated RF energy at the
(Continued)

second segment, the second zone of accumulated RF energy being distinct from the first zone of accumulated RF energy.

28 Claims, 10 Drawing Sheets
(2 of 10 Drawing Sheet(s) Filed in Color)

Related U.S. Application Data continuation of application No. 15/973,991, filed on May 8, 2018, now Pat. No. 10,511,097.

(60) Provisional application No. 62/506,556, filed on May 15, 2017, provisional application No. 62/505,813, filed on May 12, 2017.

(51) Int. Cl.

| | | |
|---|---|---|
| *H04B 5/00* | (2006.01) | |
| *H02J 50/12* | (2016.01) | |
| *H01Q 1/38* | (2006.01) | |
| *H02J 50/27* | (2016.01) | |
| *H01Q 1/24* | (2006.01) | |
| *B60L 53/12* | (2019.01) | |
| *H01F 38/14* | (2006.01) | |
| *H01Q 13/10* | (2006.01) | |
| *H02J 50/40* | (2016.01) | |
| *H02J 50/00* | (2016.01) | |

(52) U.S. Cl.
CPC ............ *H02J 50/27* (2016.02); *H04B 5/0031* (2013.01); *B60L 53/12* (2019.02); *H01F 38/14* (2013.01); *H01Q 1/243* (2013.01); *H01Q 13/10* (2013.01); *H02J 50/00* (2016.02); *H02J 50/402* (2020.01); *H02J 2310/22* (2020.01)

(58) Field of Classification Search
CPC . H02J 50/27; H02J 50/40; H02J 7/025; H01F 38/14; Y02T 90/122; H01Q 13/10
USPC .................................................. 343/700 MS
See application file for complete search history.

(56) References Cited

U.S. PATENT DOCUMENTS

| | | | |
|---|---|---|---|
| 3,434,678 | A | 3/1969 | Brown et al. |
| 3,696,384 | A | 10/1972 | Lester |
| 3,754,269 | A | 8/1973 | Gavin |
| 4,101,895 | A | 7/1978 | Jones, Jr. |
| 4,360,741 | A | 11/1982 | Fitzsimmons et al. |
| 4,944,036 | A | 7/1990 | Hyatt |
| 4,995,010 | A | 2/1991 | Knight |
| 5,200,759 | A | 4/1993 | McGinnis |
| 5,211,471 | A | 5/1993 | Rohrs |
| 5,548,292 | A | 8/1996 | Hirshfield et al. |
| 5,556,749 | A | 9/1996 | Mitsuhashi et al. |
| 5,568,088 | A | 10/1996 | Dent et al. |
| 5,646,633 | A | 7/1997 | Dahlberg |
| 5,697,063 | A | 12/1997 | Kishigami et al. |
| 5,712,642 | A | 1/1998 | Hulderman |
| 5,936,527 | A | 8/1999 | Isaacman et al. |
| 5,982,139 | A | 11/1999 | Parise |
| 6,046,708 | A | 4/2000 | MacDonald, Jr. et al. |
| 6,127,799 | A | 10/2000 | Krishnan |
| 6,127,942 | A | 10/2000 | Welle |
| 6,163,296 | A | 12/2000 | Lier et al. |
| 6,271,799 | B1 | 8/2001 | Rief |
| 6,289,237 | B1 | 9/2001 | Mickle et al. |
| 6,329,908 | B1 | 12/2001 | Frecska |
| 6,421,235 | B2 | 7/2002 | Ditzik |
| 6,437,685 | B2 | 8/2002 | Hanaki |
| 6,456,253 | B1 | 9/2002 | Rummeli et al. |
| 6,476,795 | B1 | 11/2002 | Derocher et al. |
| 6,501,414 | B2 | 12/2002 | Amdt et al. |
| 6,583,723 | B2 | 6/2003 | Watanabe et al. |
| 6,597,897 | B2 | 7/2003 | Tang |
| 6,615,074 | B2 | 9/2003 | Mickle et al. |
| 6,650,376 | B1 | 11/2003 | Obitsu |
| 6,664,920 | B1 | 12/2003 | Mott et al. |
| 6,680,700 | B2 | 1/2004 | Hilgers |
| 6,798,716 | B1 | 9/2004 | Charych |
| 6,803,744 | B1 | 10/2004 | Sabo |
| 6,853,197 | B1 | 2/2005 | McFarland |
| 6,856,291 | B2 | 2/2005 | Mickle et al. |
| 6,911,945 | B2 | 6/2005 | Korva |
| 6,960,968 | B2 | 11/2005 | Odendaal et al. |
| 6,967,462 | B1 | 11/2005 | Landis |
| 6,988,026 | B2 | 1/2006 | Breed et al. |
| 7,003,350 | B2 | 2/2006 | Denker et al. |
| 7,027,311 | B2 | 4/2006 | Vanderelli et al. |
| 7,068,234 | B2 | 6/2006 | Sievenpiper |
| 7,068,991 | B2 | 6/2006 | Parise |
| 7,079,079 | B2 | 7/2006 | Jo et al. |
| 7,183,748 | B1 | 2/2007 | Unno et al. |
| 7,191,013 | B1 | 3/2007 | Miranda et al. |
| 7,193,644 | B2 | 3/2007 | Carter |
| 7,196,663 | B2 | 3/2007 | Bolzer et al. |
| 7,205,749 | B2 | 4/2007 | Hagen et al. |
| 7,215,296 | B2 | 5/2007 | Abramov et al. |
| 7,222,356 | B1 | 5/2007 | Yonezawa et al. |
| 7,274,334 | B2 | 9/2007 | O'Riordan et al. |
| 7,274,336 | B2 | 9/2007 | Carson |
| 7,351,975 | B2 | 4/2008 | Brady et al. |
| 7,359,730 | B2 | 4/2008 | Dennis et al. |
| 7,372,408 | B2 | 5/2008 | Gaucher |
| 7,392,068 | B2 | 6/2008 | Dayan |
| 7,403,803 | B2 | 7/2008 | Mickle et al. |
| 7,443,057 | B2 | 10/2008 | Nunally |
| 7,451,839 | B2 | 11/2008 | Perlman |
| 7,463,201 | B2 | 12/2008 | Chiang et al. |
| 7,471,247 | B2 | 12/2008 | Saily |
| 7,535,195 | B1 | 5/2009 | Horovitz et al. |
| 7,614,556 | B2 | 11/2009 | Overhultz et al. |
| 7,639,994 | B2 | 12/2009 | Greene et al. |
| 7,643,312 | B2 | 1/2010 | Vanderelli et al. |
| 7,652,577 | B1 | 1/2010 | Madhow et al. |
| 7,679,576 | B2 | 3/2010 | Riedel et al. |
| 7,702,771 | B2 | 4/2010 | Ewing et al. |
| 7,786,419 | B2 | 8/2010 | Hyde et al. |
| 7,812,771 | B2 | 10/2010 | Greene et al. |
| 7,830,312 | B2 | 11/2010 | Choudhury et al. |
| 7,844,306 | B2 | 11/2010 | Shearer et al. |
| 7,868,482 | B2 | 1/2011 | Greene et al. |
| 7,898,105 | B2 | 3/2011 | Greene et al. |
| 7,904,117 | B2 | 3/2011 | Doan et al. |
| 7,911,386 | B1 | 3/2011 | Ito et al. |
| 7,925,308 | B2 | 4/2011 | Greene et al. |
| 7,948,208 | B2 | 5/2011 | Partovi et al. |
| 8,055,003 | B2 | 11/2011 | Mittleman et al. |
| 8,070,595 | B2 | 12/2011 | Alderucci et al. |
| 8,072,380 | B2 | 12/2011 | Crouch |
| 8,092,301 | B2 | 1/2012 | Alderucci et al. |
| 8,099,140 | B2 | 1/2012 | Arai |
| 8,115,448 | B2 | 2/2012 | John |
| 8,159,090 | B2 | 4/2012 | Greene et al. |
| 8,159,364 | B2 | 4/2012 | Zeine |
| 8,180,286 | B2 | 5/2012 | Yamasuge |
| 8,228,194 | B2 | 7/2012 | Mickle |
| 8,234,509 | B2 | 7/2012 | Gioscia et al. |
| 8,264,101 | B2 | 9/2012 | Hyde et al. |
| 8,264,291 | B2 | 9/2012 | Morita |
| 8,276,325 | B2 | 10/2012 | Clifton et al. |
| 8,278,784 | B2 | 10/2012 | Cook et al. |
| 8,284,101 | B2 | 10/2012 | Fusco |
| 8,310,201 | B1 | 11/2012 | Wright |
| 8,338,991 | B2 | 12/2012 | Von Novak et al. |
| 8,362,745 | B2 | 1/2013 | Tinaphong |
| 8,380,255 | B2 | 2/2013 | Shearer et al. |
| 8,384,600 | B2 | 2/2013 | Huang et al. |
| 8,410,953 | B2 | 4/2013 | Zeine |
| 8,411,963 | B2 | 4/2013 | Luff |
| 8,432,062 | B2 | 4/2013 | Greene et al. |

(56) References Cited

U.S. PATENT DOCUMENTS

| | | |
|---|---|---|
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,812,890 B1 | 11/2017 | Leabman et al. |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,866,279 B2 | 1/2018 | Bell et al. |
| 9,867,032 B2 | 1/2018 | Verma et al. |
| 9,871,301 B2 | 1/2018 | Contopanagos |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,941,754 B2 | 4/2018 | Leabman et al. |
| 9,948,135 B2 | 4/2018 | Leabman et al. |
| 9,954,374 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |

(56) References Cited

U.S. PATENT DOCUMENTS

| | | |
|---|---|---|
| 9,973,008 B1 | 5/2018 | Leabman |
| 10,003,211 B1 | 6/2018 | Leabman et al. |
| 10,008,889 B2 | 6/2018 | Bell et al. |
| 10,014,728 B1 | 7/2018 | Leabman |
| 10,027,159 B2 | 7/2018 | Hosseini |
| 10,027,180 B1 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,886 B1 | 10/2018 | Bell et al. |
| 10,103,552 B1 | 10/2018 | Leabman et al. |
| 10,103,582 B2 | 10/2018 | Leabman et al. |
| 10,116,170 B1 | 10/2018 | Leabman |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,056 B2 | 5/2019 | Bell et al. |
| 10,305,315 B2 | 5/2019 | Leabman et al. |
| 10,355,534 B2 | 7/2019 | Johnston et al. |
| 10,381,880 B2 | 8/2019 | Leabman et al. |
| 10,396,604 B2 | 8/2019 | Bell et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,511,097 B2 | 12/2019 | Kornaros et al. |
| 10,734,717 B2 | 8/2020 | Hosseini |
| 10,778,041 B2 | 9/2020 | Leabman |
| 10,790,674 B2 | 9/2020 | Bell et al. |
| 10,848,853 B2 | 11/2020 | Leabman et al. |
| 10,879,740 B2 | 12/2020 | Hosseini |
| 10,923,954 B2 | 2/2021 | Leabman |
| 10,965,164 B2 | 3/2021 | Leabman et al. |
| 10,992,185 B2 | 4/2021 | Leabman |
| 10,992,187 B2 | 4/2021 | Leabman |
| 11,011,942 B2 | 5/2021 | Liu |
| 11,245,191 B2 | 2/2022 | Kornaros et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1* | 1/2003 | Breed ............... G08G 1/096783 |
| | | 73/146 |
| 2003/0038750 A1* | 2/2003 | Chen ..................... H01Q 1/242 |
| | | 343/702 |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |

(56) References Cited

U.S. PATENT DOCUMENTS

| | | |
|---|---|---|
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0174629 A1 | 7/2010 | Taylor et al. |

(56) References Cited

U.S. PATENT DOCUMENTS

| | | |
|---|---|---|
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |

(56) References Cited

U.S. PATENT DOCUMENTS

| | | |
|---|---|---|
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |

(56) References Cited

U.S. PATENT DOCUMENTS

| | | |
|---|---|---|
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Fumi |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0181117 A1 | 6/2015 | Park et al. |
| 2015/0187491 A1 | 7/2015 | Anagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |

(56) References Cited

U.S. PATENT DOCUMENTS

| | | |
|---|---|---|
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0042206 A1 | 2/2016 | Pesavento et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0202343 A1 | 7/2016 | Okutsu |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0085437 A1 | 3/2017 | Condeixa et al. |
| 2017/0092115 A1 | 3/2017 | Sloo et al. |
| 2017/0127196 A1 | 5/2017 | Blum et al. |
| 2017/0134686 A9 | 5/2017 | Leabman |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0338695 A1 | 11/2017 | Port |
| 2018/0040929 A1 | 2/2018 | Chappelle |
| 2018/0048178 A1 | 2/2018 | Leabman |
| 2018/0131238 A1 | 5/2018 | Leabman |
| 2018/0331429 A1 | 11/2018 | Kornaros |
| 2020/0203837 A1 | 6/2020 | Kornaros et al. |

FOREIGN PATENT DOCUMENTS

| | | |
|---|---|---|
| CN | 101507044 A | 8/2009 |
| CN | 102027690 A | 4/2011 |
| CN | 102292896 A | 12/2011 |
| CN | 102860037 A | 1/2013 |
| CN | 103594776 A | 2/2014 |
| CN | 104040789 A | 9/2014 |
| CN | 203826555 U | 9/2014 |
| CN | 104090265 A | 10/2014 |
| CN | 105762946 A | 7/2016 |
| CN | 105932407 A | 9/2016 |
| CN | 103380561 B | 9/2017 |
| DE | 20016655 U1 | 2/2002 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 3067983 A1 | 9/2016 |
| EP | 3145052 A1 | 3/2017 |
| GB | 2404497 A | 2/2005 |
| JP | 2006157586 A | 6/2006 |
| JP | 2007043432 A | 2/2007 |
| JP | 2008167017 A | 7/2008 |
| JP | 2009071835 A | 4/2009 |
| JP | 2009290764 A | 12/2009 |
| JP | 2013162624 A | 8/2013 |
| JP | 2015128349 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012153529 A1 | 11/2012 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |

(56) References Cited

FOREIGN PATENT DOCUMENTS

| WO | WO 2013052950 A1 | 4/2013 |
|---|---|---|
| WO | WO 2013105920 A2 | 7/2013 |
| WO | WO 2014075103 A1 | 5/2014 |
| WO | WO 2014132258 A1 | 9/2014 |
| WO | WO 2014134996 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 8 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2018/031768, Nov. 12, 2019, 8 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.

(56) References Cited

OTHER PUBLICATIONS

Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 2, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/031768, Jul. 3, 2018, 9 pgs.
Energous Corp., ISRWO, PCT/US2018/051082, Dec. 12, 2018, 9 pgs.
Notice of Intent to Issue Reexam Certificate: 90/013,793 dated Feb. 2, 2017, 8 pgs.
Order Granting Reexamination Request, U.S. Appl. No. 90/013,793 Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc,* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.
Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP18204043,6, dated Feb. 14, 2019, 5 pgs.
Extended European Search Report, EP18797695.6, dated Nov. 19, 2020, 9 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.

(56) References Cited

OTHER PUBLICATIONS

Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11,Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

\* cited by examiner

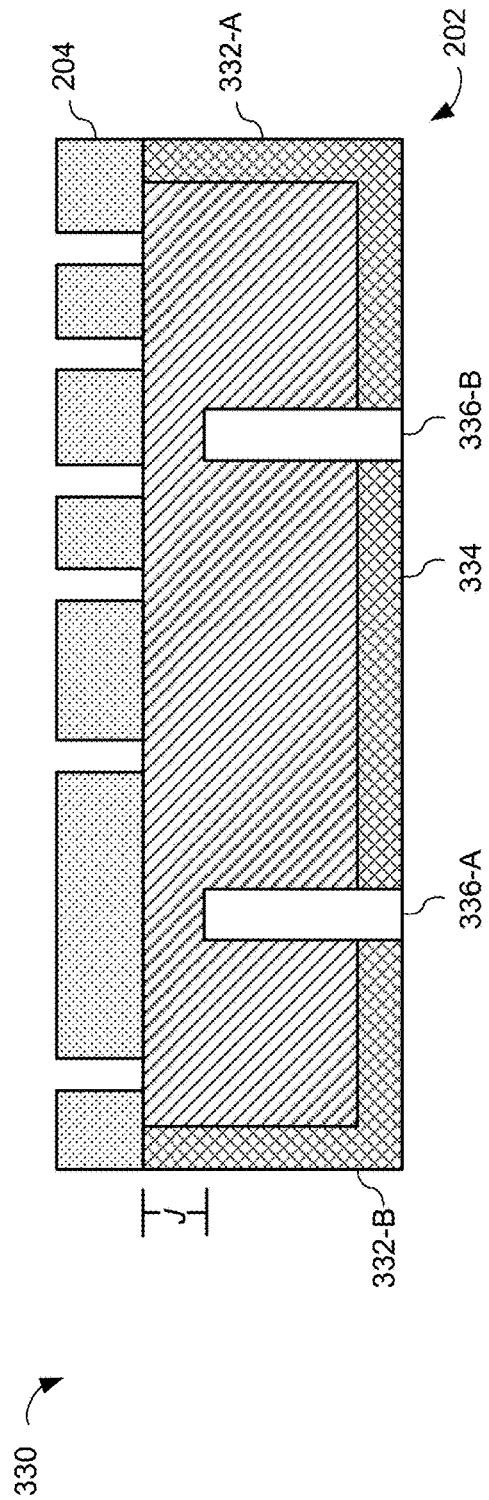
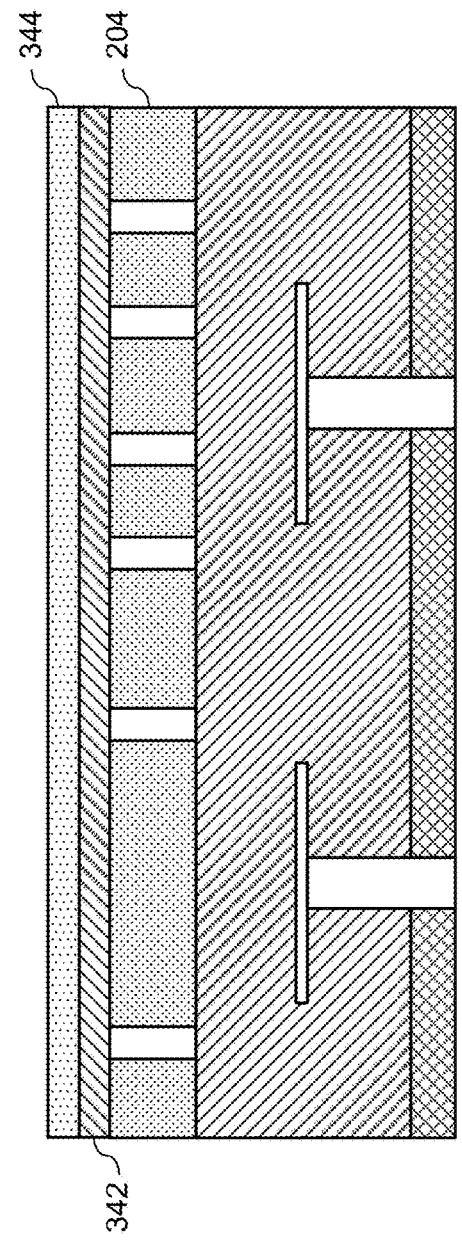
FIGURE 3C
FIGURE 3D

600

- 602 — Provide a near-field antenna that includes (A) a conductive plate having (i) first and second opposing planar surfaces and (ii) one or more cutouts extending through the conductive place from the first surface to the second surface and (B) a feed element separated from the conductive plate via an insulator

- 604 — Cause the feed element to direct a plurality of radio frequency (RF) power transmission signals towards the conductive plate

- 606 — Receive, at the conductive plate, the plurality of RF power transmission signals from the feed element

- 608 — Radiate, through the one or more cutouts, at least some of the plurality of RF power transmission signals so that RF energy from the plurality of RF power transmission signals accumulates within a near-field distance of the conductive plate to create at least two distinct zones of accumulated RF energy at each of the one or more cutouts The at least two distinct zones of accumulated RF energy at each of the one or more cutouts are defined based, at least in part, on: (i) a set of dimensions defining each of the one or more cutouts, and (ii) an arrangement of the one or more cutouts

NEAR-FIELD ANTENNAS FOR ACCUMULATING RADIO FREQUENCY ENERGY AT DIFFERENT RESPECTIVE SEGMENTS INCLUDED IN ONE OR MORE CHANNELS OF A CONDUCTIVE PLATE

RELATED APPLICATIONS

This application is a continuation of U.S. patent application Ser. No. 16/718,060, filed on Dec. 17, 2019, entitled "Fabrication Of Near-Field Antennas For Accumulating Energy At A Near-Field Distance With Minimal Far-Field Gain," which is a continuation of U.S. patent application Ser. No. 15/973,991 (now U.S. Pat. No. 10,511,097), filed on May 8, 2018, entitled "Near-Field Antennas For Accumulating Energy At A Near-Field Distance With Minimal Far-Field Gain," which claims priority to U.S. Provisional Patent Application No. 62/505,813, filed May 12, 2017, entitled "Near-Field Antennas for Accumulating Radio Frequency Energy at a Near-Field Distance with Minimal Far-Field Gain," and U.S. Provisional Patent Application No. 62/506,556, filed May 15, 2017, entitled "Near-Field Antennas for Accumulating Radio Frequency Energy at a Near-Field Distance with Minimal Far-Field Gain." each of which is herein fully incorporated by reference in its respective entirety.

TECHNICAL FIELD

The present disclosure relates generally to wireless power transmission, and more particularly to near-field antennas (e.g., non-inductive, resonant near-field antennas) that accumulate energy at a near-field distance to wirelessly deliver power to a receiver.

BACKGROUND

Portable electronic devices such as smartphones, tablets, notebooks and other electronic devices have become a necessity for communicating and interacting with others. The frequent use of portable electronic devices, however, uses a significant amount of power, which quickly depletes the batteries attached to these devices. Inductive charging pads and corresponding inductive coils in portable devices allow users to wirelessly charge a device by placing the device at a particular position on an inductive pad to allow for a contact-based charging of the device due to magnetic coupling between respective coils in the inductive pad and in the device.

Conventional inductive charging pads, however, suffer from many drawbacks. For one, users typically must place their devices at a specific position and in a certain orientation on the charging pad because gaps ("dead zones" or "cold zones") exist on the surface of the charging pad. In other words, for optimal charging, the coil in the charging pad needs to be aligned with the coil in the device in order for the required magnetic coupling to occur. Additionally, placement of other metallic objects near an inductive charging pad may interfere with operation of the inductive charging pad, so even if the user places their device at the exact right position, if another metal object is also on the pad, then magnetic coupling still may not occur and the device will not be charged by the inductive charging pad. This results in a frustrating experience for many users as they may be unable to properly charge their devices. Also, inductive charging requires a relatively large receiver coil to be placed within a device to be charged, which is less than ideal for devices where internal space is at a premium.

Charging using electromagnetic radiation (e.g., microwave radiation waves) offers promise, but RF charging is typically focused on far-field charging and not near-field charging where the device to be charged is placed on top of the RF energy transmitter. Furthermore, controlling far-field gain is a challenge that also must be solved to avoid causing interference with other devices operating in certain frequency bands (e.g., microwave frequency bands).

SUMMARY

Accordingly, there is a need for a near-field wireless charging solution that (i) accumulates energy at a near-field distance to wirelessly deliver power to a receiver, (ii) minimizes far-field gain so as to avoid interference with other devices and comply with government guidelines and regulations, and (iii) allows users to place their devices at any position on a pad and still receive wireless delivered energy. In some embodiments, these charging pads include a plurality of near-field antennas (e.g., non-inductive resonant near-field antennas), and a method of operating one such near-field antenna is described below.

For the purposes of this disclosure, the near-field antennas described herein are referred to interchangeable as unit cell antennas, NF antennas, and non-inductive resonant antennas. Also, references to near-field transmission cover the radiation of electromagnetic waves for distances up to and including 1 to 5 millimeters away from a surface of a charging pad transmitter, while references to far-field transmission cover radiation of electromagnetic waves for distances over 5 millimeters (and up to 30 feet away from a far-field transmitter). In some instances, references to near-field transmission cover the radiation of electromagnetic waves for distances up to a quarter wavelength of an operating frequency (e.g., a quarter wavelength of an operating frequency of 5.8 GHz is approximately 12.922 millimeters). In some embodiments, the operating frequency ranges from 400 MHz to 60 GHz.

(A1) In some embodiments, a method of operating a near-field antenna includes, providing a near-field antenna that includes a conductive plate having first and second opposing planar surfaces, and one or more cutouts (also referred to herein as one or more slots) extending through the conductive plate from the first surface to the second surface. The near-field antenna also includes a feed element separated from the first surface of the conductive plate by an insulator. The method further includes causing the feed element to direct a plurality of RF power transmission signals towards the conductive plate and receiving, at the conductive plate, the plurality of RF power transmission signals from the feed element. The method further includes radiating, through the one or more cutouts, at least some of the plurality of RF power transmission signals so that RF energy from the plurality of RF power transmission signals accumulates within a near-field distance of the conductive plate to create at least two distinct zones of accumulated RF energy at each of the one or more cutouts. The at least two distinct zones of accumulated RF energy at each of the one or more cutouts are defined based, at least in part, on: (i) a set of dimensions defining each of the one or more cutouts, and (ii) an arrangement of the one or more cutouts.

(A2) In some embodiments of the method of A1, a first cutout of the one or more cutouts forms a first meandering line pattern and a second cutout of the one or more cutouts forms a second meandering line pattern.

(A3) In some embodiments of the method of A2, a shape of the first meandering line pattern mirrors a shape of the second meandering line pattern, the first and second meandering line patterns have the same set of dimensions, and the shape of the first meandering line pattern is rotated (e.g., rotated 180 degrees) with respect to the shape of the second meandering line pattern. For example, the shape of the first meandering line pattern is interleaved with the shape of the second meandering line pattern (e.g., two U-shaped patterns with a leg of each U-shaped pattern being interleaved or interposed between the two legs of the other U-shaped pattern, as shown in FIG. 2 and described in more detail below). Alternatively, in some embodiments, a single cutout forms a symmetrical meandering line pattern (e.g., as shown in FIG. 5A).

(A4) In some embodiments of the method of any of A1-A3, a respective cutout of the one or more cutouts has a respective length that is at least as large as a wavelength of a respective RF power transmission signal of the plurality of RF power transmission signals.

(A5) In some embodiments of the method of A4, the respective cutout includes, at least: (i) a first cutout portion defined in a first direction, and (ii) a second cutout portion defined in a second direction, the second direction being orthogonal to the first direction. Furthermore, a first of the at least two distinct zones of accumulated RF energy is created at the first cutout portion (e.g., formed along the first cutout portion and along the first direction) and a second of the at least two distinct zones of accumulated RF energy is created at the second cutout portion (e.g., formed along the second cutout portion and along the second direction).

(A6) In some embodiments of the method of any of A1-A5, the feed element is a component of a patch antenna, where the insulator is disposed between the feed element and the conductive plate.

(A7) In some embodiments of the method of any of A1-A5, the feed element is a component of a patch antenna that is at least partially encapsulated within the insulator.

(A8) In some embodiments of the method of any of A1-A7, the insulator is selected from the group consisting of: a polymer, a fiber reinforced polymer, glass, and air.

(A9) In some embodiments of the method of any of A1-A8, the at least two distinct zones cover at least 80% of a surface area of the second surface of the conductive plate.

(A10) In some embodiments of the method of any of A1-A9, the at least two distinct zones cover at least 90% of the surface area of the second surface of the conductive plate.

(A11) In some embodiments of the method of any of A1-A10, the at least two distinct zones of accumulated RF energy extend no more than 5 millimeters (mm) above the second surface of the conductive plate.

(A12) In some embodiments of the method of any of A1-A11, the at least two distinct zones of accumulated RF energy extend no more than 4 millimeters above the second surface of the conductive plate.

(A13) In some embodiments of the method of any of A1-A12, the at least two distinct zones of accumulated RF energy extend no more than 3 millimeters above the second surface of the conductive plate.

(A14) In some embodiments of the method of any of A1-A13, the plurality of RF power transmission signals are transmitted at a frequency selected from the group consisting of: 5.8 GHz, 2.4 GHz, and 900 MHz.

(A15) In some embodiments of the method of any of A1-A14, the near-field antenna is a first near-field antenna and is part of a near-field charging pad (e.g., transmitter pad 100, FIGS. 1A-1B) that also includes a second near-field antenna that is positioned adjacent to the first near-field antenna within the near-field charging pad. Furthermore, respective cutouts associated with the second near-field antenna are rotated relative to the one or more cutouts associated with the first near-field antenna.

(A16) In some embodiments of the method of any of A1-A15, the feed element receives the one or more RF power transmission signals from a power amplifier in response to determining that a wireless power receiver is placed within a predetermined distance of the surface.

(A17) In some embodiments of the method of A16, the predetermined distance is less than approximately 5 mm away from the surface.

(A18) In some embodiments of the method of A17, the predetermined distance is monitored by measuring a signal strength level associated with a transmission received by a processor connected to (e.g., in electrical communication with) the near-field antenna and the signal strength level is associated with a broadcasted signal received from the wireless power receiver.

(A19) In some embodiments of the method of any of A1-A18, the feed element and the insulator are surrounded by a conductive housing. Furthermore, the conductive housing defines an opening at one end of the housing and the conductive plate closes the opening.

(A20) In some embodiments of the method of any of A1-A19, the conductive plate is a first conductive plate, and the near-field antenna further includes another insulator (e.g., a dielectric layer) disposed on the second surface of the first conductive plate and a second conductive plate disposed on top of the other insulator. In some embodiments, the second conductive plate includes one or more additional cutouts. Alternatively, in some embodiments, instead of a second conductive plate, the near-field antenna further includes a conductive layer deposited on a surface of the other insulator.

(A21) In some embodiments of the method of any of A1-A20, the conductive plate is a conductive layer deposited on a surface of the insulator. Alternatively, in some embodiments, the insulator is a dielectric layer that is deposited on the first surface of the conductive plate.

(A22) In some embodiments of the method of any of A1-A21, the insulator is a first insulator, and the near-field antenna further includes a second insulator that separates the feed element from a grounding plate (e.g., grounding plate 308, FIG. 3A).

(A23) In one other aspect, a near-field antenna is provided, and the near-field antenna includes the structural characteristics for a near-field antenna described above in A1-A22, and the near-field antenna is also configured to perform the method steps described above in A1-A22.

(A24) In another aspect, a transmitter pad that includes a plurality of near-field antennas is provided. In some embodiments, the transmitter pad includes at least one near-field antenna, one or more communications components, one or more processors, and memory storing one or more programs, which when executed by the one or more processors cause the transmitter pad to perform the method described in any one of A1-A22.

(A25) In yet another aspect, a transmitter pad (that includes a plurality near-field antennas) is provided and the transmitter pad includes means for performing the method described in any one of A1-A22.

(A26) In still another aspect, a non-transitory computer-readable storage medium is provided. The non-transitory computer-readable storage medium stores executable instructions that, when executed by a transmitter pad (that includes a plurality of near-field antennas) with one or more processors/cores, cause the transmitter pad to perform the method described in any one of A1-A22.

(B1) In some embodiments, a method of fabricating a near-field antenna includes selecting a set of dimensions for one or more cutouts to be defined through a conductive plate of a near-field antenna, the conductive plate having opposing first and second planar surfaces. The method further includes forming the one or more cutouts through the first and second surfaces of the conductive plate in a predefined arrangement, each of the one or more cutouts having the set of dimensions. The method further includes coupling an insulator to the first surface of the conductive plate and coupling a feed element to the insulator. In some embodiments, the fabricated near-field antenna includes the structural characteristics for a near-field antenna described above in A1-A22, and the near-field antenna is also configured to perform the method steps described above in A1-A22.

(C1) In yet another aspect, a near-field antenna is provided. The near-field antenna includes: (i) a feed element configured to direct a plurality of radio frequency (RF) power transmission signals towards a conductive plate, (ii) a first slot defined through the conductive plate having a length that is at least as large as a wavelength of a respective RF power transmission signal of the plurality of RF power transmission signals transmitted by the feed element, and (iii) a second slot defined through the conductive plate that interlocks with the first slot and also has a length that is at least as large as the wavelength of the respective RF power transmission signal. Further, upon conduction of the plurality of RF power transmission signals via the first and second slots, at least two distinct zones of accumulated RF energy form along the length of each of the first and second slots. The near-field antenna includes the structural characteristics for a near-field antenna described above in A1-A22, and the near-field antenna is also configured to perform the method steps described above in A1-A22.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 3A-3D show cross-sectional views of a transmitter pad, in accordance with some embodiments.

FIG. 6 is a flow diagram showing a method of operating a near-field antenna, in accordance with some embodiments.

Figure 1B:
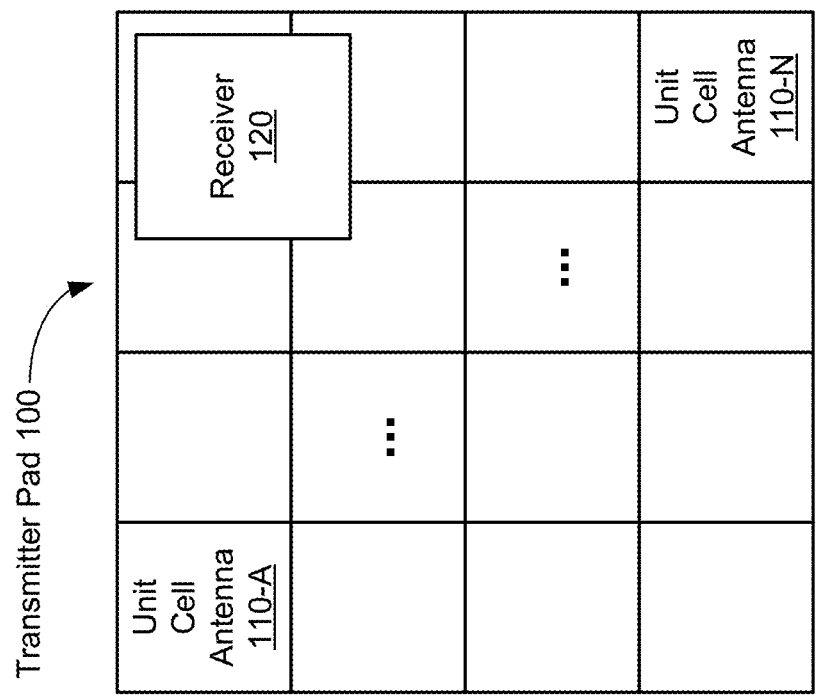
FIGS. 1A-1B show diagrams illustrating a representative transmitter pad in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1A:
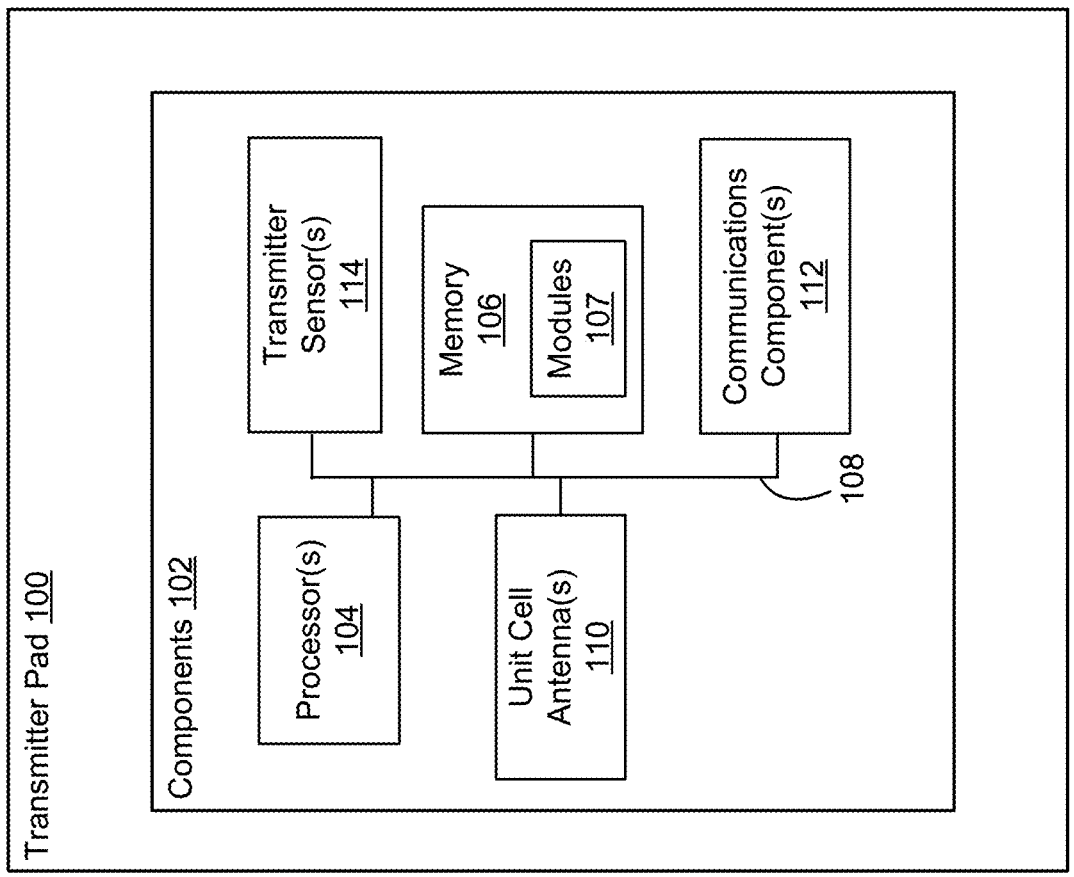

FIG. 1A is a high-level block diagram of a transmitter pad 100, in accordance with some embodiments. The transmitter pad 100 (also referred to herein as near-field radio- frequency (RF) charging pad or near-field charging pad) includes components 102. The transmitter pad is configured to generate controlled, near-field accumulations of electromagnetic energy that are provided to a receiver that is placed near or on top of (e.g., within 5 mm of a surface)of the transmitter pad 100. For example, FIG. 1B illustrates a wireless power receiver 120 (e.g., a receiver coupled to or housed within any type of electronic device that requires electricity to operate) placed on top of the transmitter pad 100 that is harvesting energy from the near-field accumulations of electromagnetic energy to charge or power a device coupled to the wireless power receiver. In the descriptions herein, radio frequency (RF) power transmission waves are used as a primary illustrative example, but one or ordinary skill in the art will appreciate in view of these descriptions that any type of electromagnetic radiation waves may be used instead in certain embodiments or implementations.

The components 102 of the transmitter pad 100 include, for example, one or more processor(s) 104, a memory 106, one or more unit cell antennas 110 (also referred to herein as near-field antennas), one or more communications components 112, and/or one or more transmitter sensors 114. In some embodiments, these components 102 are interconnected by way of a communications bus 108. In some embodiments, the components 102 are housed within the transmitter pad 100. Alternatively, in some embodiments, one or more of the components 102 are disposed outside (e.g., external) the transmitter pad 100. For example, the one or more processor(s) 104, the memory 106, the one or more communications components 112, may be external while the one or more unit cell antennas 110 and the one or more transmitter sensors 114 may be internal (or some other combination/arrangement of components).

In some embodiments, the communication component(s) 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

In some embodiments, the communications component 112 transmits communication signals to the receiver 120 by way of the electronic device. For example, the communications component 112 may convey information to a communications component of the electronic device (e.g., electronic device 210, FIG. 2), which the electronic device may in turn convey to the receiver 120 (e.g., via a bus).

In some embodiments, the receiver 120 includes a communications component configured to communicate various types of data with the transmitter pad 100, through a respective communication signal generated by the receiver-side communications component. The data may include location indicators for the receiver 120, a power status of the electronic device, status information for the receiver 120, status information for the electronic device, status information about the power waves, and/or status information for accumulations of energy (e.g., the distinct zones). In other words, the receiver 120 may provide data to the transmitter pad 100, by way of a communication signal, regarding the current operation of the transmitter pad 100 (or a current operation of a unit cell), including: information identifying a present location of the receiver 120, an amount of energy (i.e., usable power) received by the receiver 120, and an amount of usable power received and/or used by the electronic device, among other possible data points containing other types of information. This information may be used by the transmitter pad 100 in conjunction with the embodiments described herein.

In some embodiments, the data contained within communication signals is used by the electronic device, the receiver 120, and/or the transmitter pad 100 for determining adjustments of the one or more characteristics used by the unit cell antenna 110 to transmit the power waves. Using a communication signal, the transmitter pad 100 receives data that is used, e.g., to identify receivers 120 on the transmitter pad 100, identify electronic devices, determine safe and effective waveform characteristics for power waves, and/or hone the placement of the accumulations of energy. In some embodiments, the receiver 120 uses a communication signal to communicate data for, e.g., alerting the transmitter pad 100 that the receiver 120 has or is about to be placed on the transmitter pad 100, provide information about electronic device, provide user information that corresponds to electronic device, indicate the effectiveness of received power waves, and/or provide updated characteristics or transmission parameters that are used to form the near-field accumulations of energy.

Non-limiting examples of transmitter sensors 114 include, e.g., infrared, pyroelectric, ultrasonic, laser, optical, Doppler, gyro, accelerometer, microwave, millimeter, RF standing-wave sensors, resonant LC sensors, capacitive sensors, light sensor, and/or inductive sensors. In some embodiments, technologies for the transmitter sensor(s) 114 include binary sensors that acquire stereoscopic sensor data, such as the location of a human or other sensitive object.

Figure 4A:
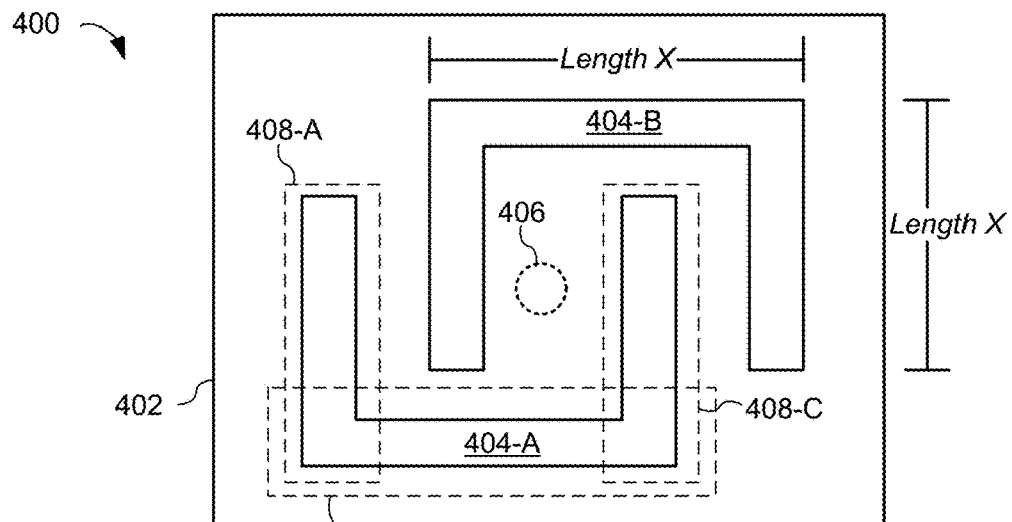
FIGS. 4A-4C show various views of a respective near-field antenna of a transmitter pad, in accordance with some embodiments.
Figure 4B:
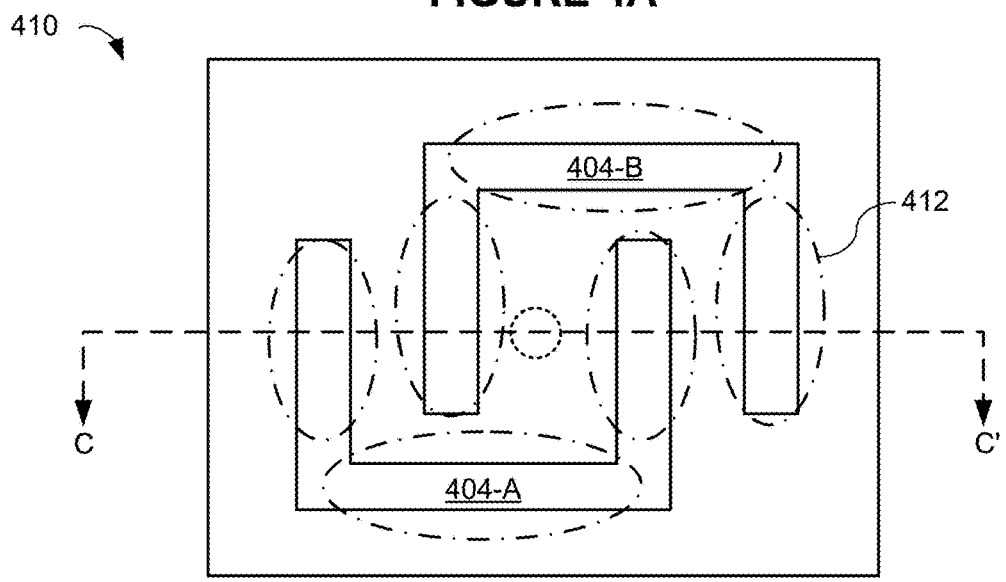
Figure 4C:
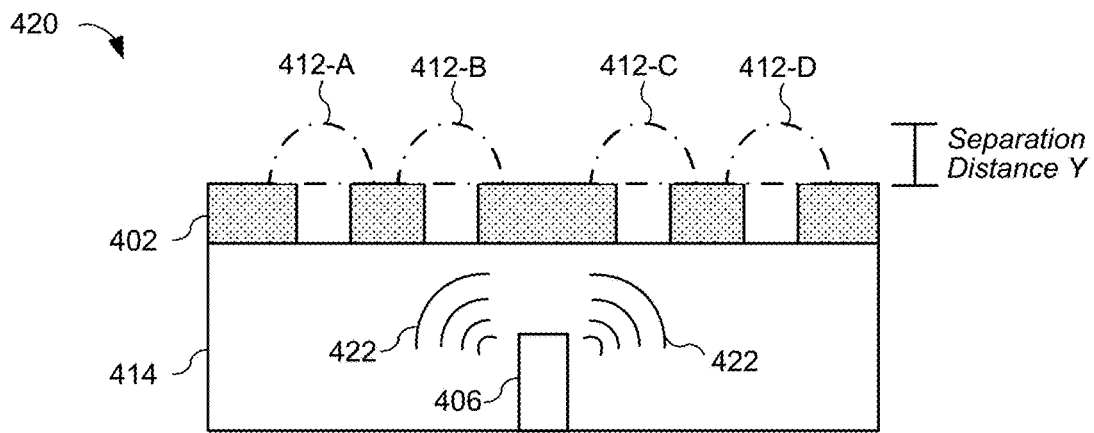

In some embodiments, the memory 106 of the transmitter pad 100 stores one or more programs (e.g., sets of instructions) and/or data structures, collectively referred to herein as "modules." In some embodiments, the memory 106, or the non-transitory computer readable storage medium of memory 106 stores the following modules 107 (e.g., programs and/or data structures), or a subset or superset thereof:

information received from the receiver 120 (e.g., generated by a sensor of the receiver 120 and then transmitted to the transmitter pad 100);

information received from transmitter sensor(s) 114;

RF power transmission signals generation module for generating and transmitting (e.g., in conjunction with unit cell antenna(s) 110) RF power transmission signals (e.g., RF power transmission signals 422, FIG. 4C);

a characteristic selection module for selecting waveform characteristics of the RF power transmission signals; and/or a beacon transmitting module that transmits (or receives) a communication signal for detecting a receiver 120 (e.g., within a near-field transmission range of the transmitter pad 100).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, the memory 106 stores a subset of the modules identified above. Furthermore, the memory 106 may store additional modules not described above. In some embodiments, the modules stored in memory 106, or a non-transitory computer readable storage medium of the memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to memory 106 is implemented on the memory 104 of a server (not shown) that is communicatively coupled to the transmitter pad 100 and/or by a memory of the electronic device and/or the receiver 120. In addition, the memory 106 may store other information such as certain thresholds and criteria, as well as identifiers of certain receivers.

Turning to FIG. 1B, a simplified top view of the transmitter pad 100 is illustrated. FIG. 1B shows a wireless power receiver 120 (also referred to as a receiver 120, e.g., a receiver that is internally or externally coupled to an electronic device) that is placed on top of the transmitter pad 100 and then receives energy from near-filed accumulations of energy formed by the unit cell antennas 110. In some embodiments, the receiver 120 includes one or more antennas for receiving energy from the near-field accumulations of energy formed by the transmitter pad 100 and a communications component for receiving communications (or sending communications) sent by the transmitter pad 100. The communications component of the receiver 120 may also include hardware capable of data communications using the variety of wireless protocols listed above with reference to the communication component(s) 112.

The receiver 120 converts energy from received signals (also referred to herein as RF power transmission signals, or simply, RF signals, power waves, or power transmission signals) into electrical energy to power and/or charge an electronic device coupled to the receiver 120. For example, the receiver 120 uses a power converter to convert captured energy from power waves to alternating current (AC) electricity or direct current (DC) electricity usable to power and/or charge an electronic device. Non-limiting examples of power converter include rectifiers, rectifying circuits, voltage conditioners, among suitable circuitry and devices.

Figure 2:
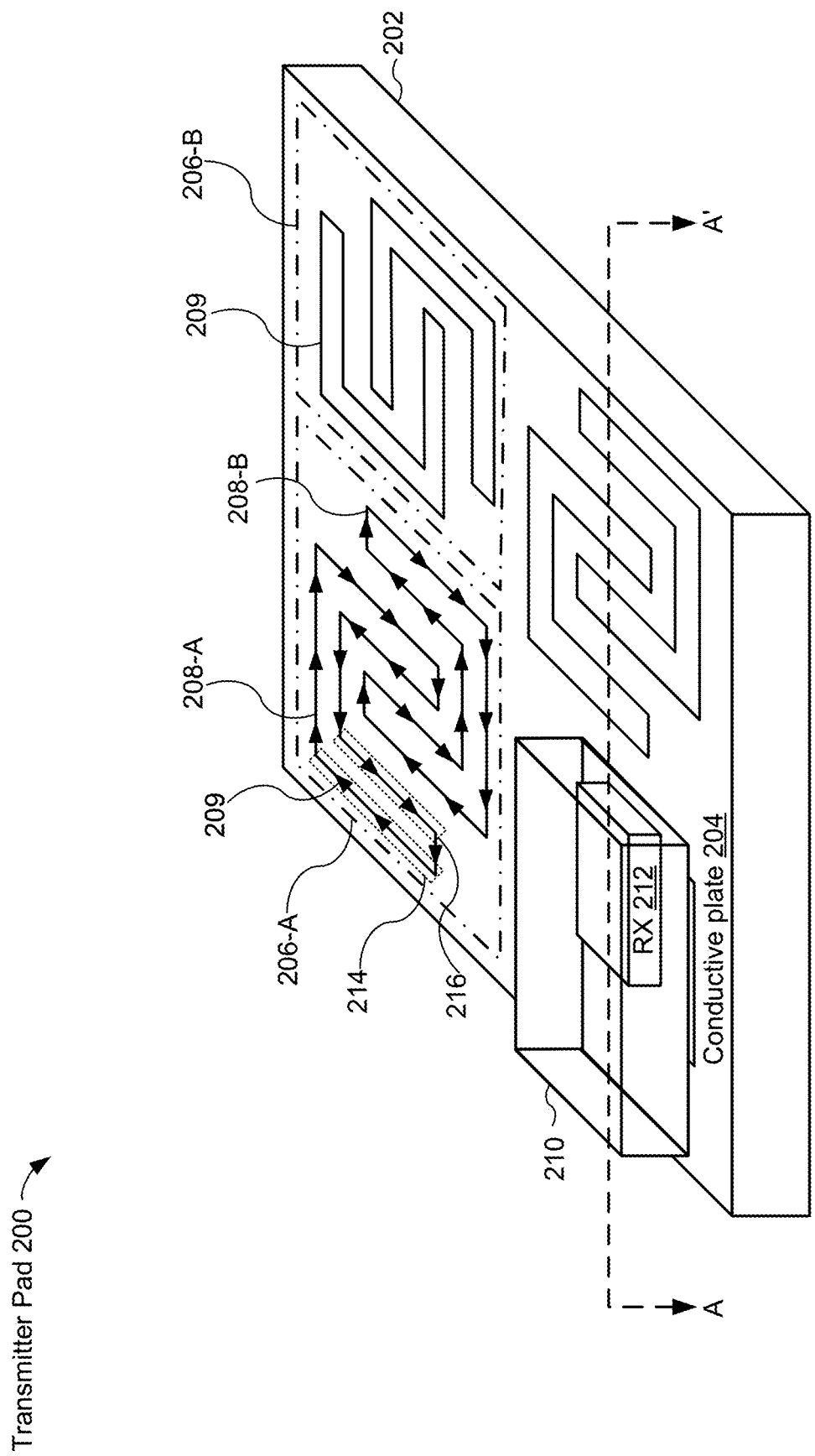
FIG. 2 is a schematic of a top section of a transmitter pad, in accordance with some embodiments.

In some embodiments, the receiver 120 is a standalone device that is detachably coupled to one or more electronic devices (e.g., electronic device 210, FIG. 2). For example, electronic device has processor(s) for controlling one or more functions of electronic device and the receiver 120 has processor(s) for controlling one or more functions of receiver. In some embodiments, the receiver 120 is a component of the electronic device. For example, one or more processor(s) of the electronic device control functions of the electronic device and the receiver 120. In addition, in some embodiments, the receiver 120 includes processor(s) which communicate with processor(s) of the electronic device.

In some embodiments, the receiver 120 receives one or more power waves directly from the transmitter pad 100. In some embodiments, the receiver 120 harvests power waves from one or more accumulations of energy (e.g., accumulation of energy 412, FIG. 4B) created by one or more power waves transmitted by the transmitter pad 100. As will be discussed in greater detail below, the one or more power waves cause accumulations of energy to form at "cutouts" (e.g., cutouts 404-A and 404-B, FIG. 4A) defined in a respective unit cell 110 (e.g., unit cell 400, FIG. 4A). In some embodiments, the transmitter pad 100 is a near-field transmitter that transmits the one or more power waves within a near-field distance of its charging surface.

In some embodiments, after energy is harvested from the accumulations of energy (as discussed in greater detail below), circuitry (e.g., integrated circuits, amplifiers, rectifiers, and/or voltage conditioner) of the receiver 120 converts the energy to usable power (i.e., electricity), which powers the electronic device associated with the receiver 120 (and/or the usable power is stored in a battery of electronic device). In some embodiments, a rectifying circuit of the receiver 120 converts the electrical energy from AC to DC for use by the electronic device. In some embodiments, a voltage conditioning circuit increases or decreases the voltage of the electrical energy as required by the electronic device, and may produce a constant voltage for providing electricity in a form required by the electronic device.

In some embodiments, the receiver 120 harvests energy from near-field accumulations of electromagnetic energy formed by multiple unit cell antennas 110 of the transmitter pad 100. In some embodiments, a plurality of electronic devices may be positioned on a surface of the transmitter pad 100, each having at least one respective receiver 120 that is used to receive power waves from the transmitter pad 100. In some embodiments, the transmitter pad 100 adjusts one or more characteristics (e.g., waveform characteristics, such as phase, gain, amplitude, frequency, etc.) of the power waves to controllably form the one or more accumulations of energy. As described in more detail below in reference to FIGS. 4A-4C, the transmitter pad 100 may adjust sets of characteristics for transmitting the power waves to account for different receivers and electronic devices housing the receivers (e.g., distance between the receiver 120 (which may be embedded at different positions in different types of electronic devices) and the transmitter pad 100 may vary from one receiver to the next).

In some embodiments, circuits (not shown) of the transmitter pad 100, such as a controller circuit and/or waveform generator, may at least partially control the behavior of the unit cell antennas 110. For example, based on the information received from the receiver by way of a communication signal (or data gathered by transmitter sensor(s) 114), a controller circuit may determine a set of one or more waveform characteristics (e.g., amplitude, frequency, direction, phase, among other characteristics) used for transmitting the power waves that would effectively provide power to the receiver 120. The controller circuit may also identify one or more unit cell antennas 110 that would be effective in transmitting the power waves (e.g., receiver 120 may be positioned between two unit cells, and in such a case, two unit cell antennas may be activated).

As will be discussed in more detail, dimensions (e.g., width, depth, and length) of "cutouts" in a respective unit cell antenna are selected to reduce far-field gain of the power waves that are used to form the near-field accumulations of energy on a respective surface of a respective unit cell antenna. For example, the dimensions are selected so that when a current flows along a respective cutout, a near-field electromagnetic field is generated, and far-field electromagnetic fields generated by adjacent unit cell antennas cancel, thereby ensuring that only near-field accumulations of energy remain, thereby minimizing or eliminating far-field gain.

As also shown in FIG. 1B, the transmitter pad includes a plurality of unit cell antennas (e.g., unit cell 110-A, . . . unit cell 110-N). A unit cell antenna is also interchangeably referred to herein as a unit cell, near-field antenna, NF antenna, or non-inductive resonant NF antenna. In some embodiments, the unit cell antennas 110 cover all or a portion of a surface area of the transmitter pad 100. The plurality of unit cell antennas 110 may contact a top surface (i.e., a charging surface) of the transmitter pad 100 (e.g., the unit cells 100 and other components 102 of the transmitter pad 100 may be encapsulated within a plastic or other type of covering).

FIG. 2 is an oblique view of a transmitter pad 200, in accordance with some embodiments. In some embodiments, the transmitter pad 200 is the transmitter pad 100 FIG. 1. The transmitter pad 200 includes a housing 202 that defines an internal cavity. The internal cavity houses, at a minimum, a plurality of unit cells 110. Moreover, the housing 202 may also house other components 102 of transmitter pad 100 (FIG. 1A). In some embodiments, the housing 202 may be formed using a unibody configuration in which some or all of the housing 202 is machined or molded as a single structure or may be formed using multiple structures (e.g., an internal frame structure, one or more structures that form exterior housing surfaces, etc.). The housing 202 may be formed of metal (e.g., steel, aluminum, brass, copper, etc.), other suitable materials, or a combination of any two or more of these materials. In some embodiments, at least two portions (e.g., a sidewall and a surface) of the housing 202 are made from different materials having different electromagnetic properties (e.g., permeability and permittivity). In some embodiments, the housing 202 is made entirely of a material that obstructs electromagnetic radiation (e.g., copper, steel, aluminum, etc.).

The transmitter pad 200 includes a conductive layer or plate 204. In some embodiments, the conductive plate 204 is part of the housing 202 (e.g., part of the housing's unibody configuration). In some embodiments, the housing 202 and the conductive plate 204 are separate components of the transmitter pad 200. In these embodiments, the housing 202 includes an opening at one end of the housing 202 and the conductive plate 204 closes the opening. In some embodiments, the conductive plate 204 and the housing 202 are made from the same material(s) (e.g., a same type of metal, such as copper, nickel, etc.). In some embodiments, the conductive plate 204 and the housing 202 are made from at least one different material.

Figure 3A:
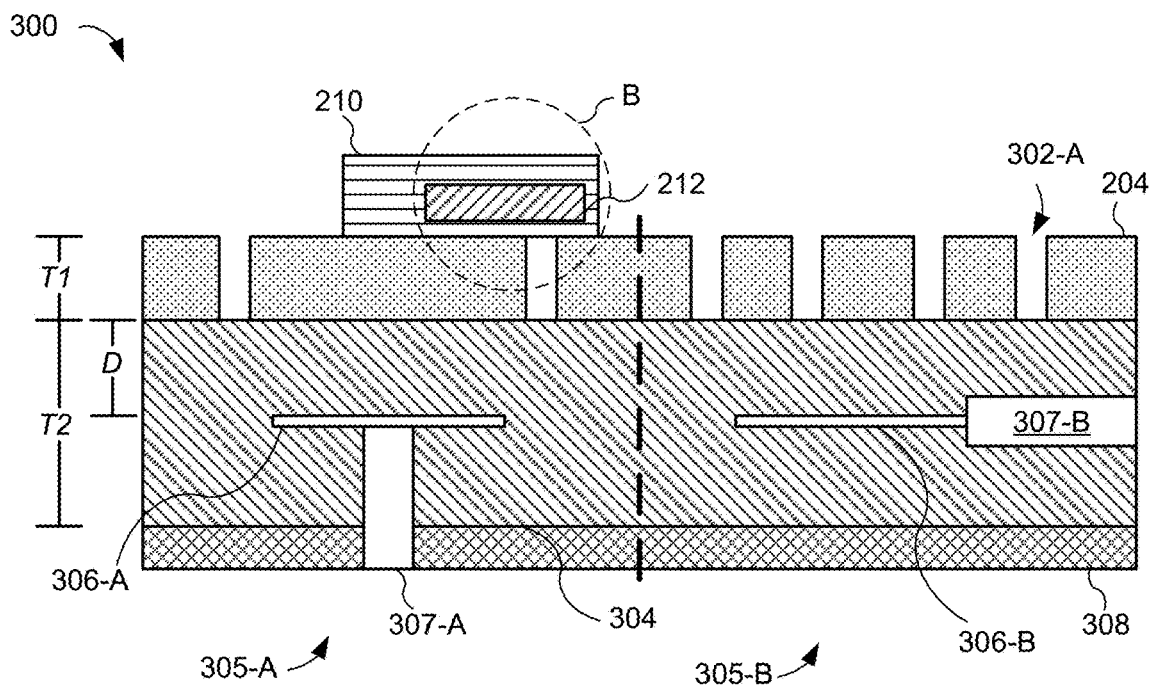

In some embodiments, the transmitter pad 200 also includes a ground or grounding plate (e.g., grounding plate 308, FIG. 3A). As shown in FIG. 3A, an insulator (e.g., a dielectric material) may separate the conductive plate 204 from the grounding plate 308.

In some embodiments, the conductive plate 204 includes a plurality of distinct wireless charging regions that are each associated with at least one unit cell (dotted boxes 206-A and 206-B define respective wireless charging regions). A wireless charging region is an area of the conductive plate 204 where wireless charging of receiver 212 (e.g., receiver 120, FIG. 1B) is facilitated due to formation (by respective unit cells 110) of near-field accumulations of electromagnetic energy within one or more of the wireless charging regions. In some embodiments, the plurality of unit cells cover substantially all of a surface area (e.g., 80% or more) of the conductive plate 204. In this way, a user may wirelessly charge his or her device at various positions on the conductive plate 204. In other words, the user need only place his or her device including a receiver on the transmitter pad and charging will occur without needing to be concerned about the exact location or orientation of the device.

Each unit cell 206 includes one or more cutouts 208-A and 208-B (e.g., channels/slots extending through the conductive layer or plate 204) that facilitate formation of the near-field accumulations of electromagnetic energy within each of the wireless charging regions. For example, when RF power transmission signals 422 (FIG. 4C) are transmitted by a feed beneath wireless charging region 206-A, at least some of the RF signals reach the conductive plate 204 and excite a current flow 209 around an edge/perimeter of the conductive plate 204 that is along each of the cutouts 208-A, 208-B associated with the unit cell antenna of the wireless charging region 206-A. Based on dimensions of the cutouts 208, arrangement of the cutouts 208, and a direction of the current flow 209 at each particular segment of the cutouts 208 (e.g., the current 209 at segment 214 of the cutout 208-A is flowing in a first direction, as indicated by arrows, and the current 209 at segment 216 of the cutout 208-A is flowing in a second direction that is opposite to the first direction), the accumulations of energy radiate away from the cutouts 208 (e.g., an electromagnetic field radiates away from segment 214 and another electromagnetic field radiates away from segment 216). These accumulations of energy formed by the RF signals exciting the conductive plate 204 are also referred to herein as "hot zones" or simply "zones." As noted above, the receiver may harvest energy from these accumulations of energy to deliver power or charge to an electronic device coupled to the receiver.

In some embodiments, each cutout includes a set of dimensions (e.g., a width, a depth (e.g., thickness of the conductive plate 204), and a length). Characteristics of the accumulations of energy (e.g., height, width, degree of concentration, near-field gain, far-field gain, etc.) formed at the one or more cutouts depend, at least in part, on the set of dimensions of the one or more cutouts. In some instances, the set of dimensions of a cutout (and in turn, a respective segment of the cutout) are carefully selected based on the requirements of the application so that characteristics of the accumulations of energy facilitate proper charging of the receiver 212, e.g., a width of the cutout 208-A is selected so that electromagnetic fields radiating from segments 214 and 216 of the cutout 208-A at least partially cancel each other out (e.g., in the far-field region), thereby minimizing far-field gain, while still creating accumulations of energy that extend far enough above the outer surface of the conductive plate 204 to deliver power to receivers that are embedded within electronic devices (and, since they are embedded, the accumulations need to travel above the surface of the conductive plate 204 to reach these embedded receivers.

In some embodiments, the one or more cutouts in a respective wireless charging region all have a same shape. For example, a unit cell within wireless charging region 206-A includes the first cutout 208-A and the second cutout 208-B. As shown, a shape of the first cutout 208-A mirrors a shape of the second cutout 208-B. Furthermore, in some embodiments, the first cutout 208-A and the second cutouts 208-B are arranged in an interleaved or interposed fashion (i.e., mated). In doing so, accumulations of energy formed at the first and second cutouts 208-A, 208-B cover a threshold amount of surface area associated with the wireless charging area 206-A (e.g., at least 80% of a surface area of the conductive plate 204 that is associated with wireless charging region 206-A, or some greater (or lesser) amount). Additionally, due to the interleaved or interposed arrangement of the first and second cutouts 208, far-field components of electromagnetic fields radiating from respective segments of the first cutout 208-A at least partially cancel far-field components electromagnetic fields radiating from respective segment of the second cutout 208-B (e.g., segments that are adjacent to one another). As such, far-field gain is further reduced.

In some embodiments, adjacent unit cells on the conductive plate 204 are rotated relative to one another. For example, a first unit cell within wireless charging region 206-A is rotated relative to a second unit cell within wireless charging region 206-B, which is adjacent to the first unit cell. The first unit cell and the second unit cell include cutouts arranged in the same interleaved or interposed fashion. However, the cutouts in the first unit cell are arranged along a first axis (e.g., a vertical axis) and the cutouts in the second unit cell are arranged along a second axis (e.g., a horizontal axis), the second axis being perpendicular to the first axis. Due to the rotated arrangement of the unit cells, some parts of electromagnetic fields radiating from the second cutout 208-B at least partially cancel some parts of electromagnetic fields radiating from cutout 209 of a unit cell associated with wireless charging region 206-B. As such, far-field gain is further reduced.

An electronic device 210 is disposed on the outer surface of the conductive plate 204 and is positioned over an additional unit cell (not pictured in FIG. 2). The receiver 212 (e.g., receiver 120, FIG. 1B) embedded in the electronic device 210 is also positioned over this additional unit cell. As such, the transmitter pad 200 (e.g., transmitter pad 100, FIGS. 1A-1B), after detecting the receiver 212, may initiate wireless charging of the receiver 212. In some embodiments, the transmitter pad 200 detects the receiver by receiving (or exchanging) a communication signal from the receiver 212. Alternatively or in addition, in some embodiments, the transmitter pad 200 detects the presence of the receiver via one or more transmitter sensors 114 (FIG. 1A). For example, a light sensor of the transmitter pad 200 may detect a change in light inside the internal cavity of the housing 202 when the electronic device is positioned over one of the cutouts in the conductive plate 204. In another example, an infrared sensor of the transmitter pad 200 may detect a change in temperature at the conductive plate 204 when the electronic device is positioned over one of the cutouts in the conductive plate 204. Other types of sensors and sensor data may be used to detect the receiver 212.

It should be understood that although the cutouts 208 are shown with a particular shape (e.g., a U or horseshoe shape), the cutouts may have other suitable shapes (e.g., different unit cell antennas within one transmitter pad could have different shapes). In addition, a size of the electronic device 210 and the receiver 212 relative to a size of the unit cells 206 shown in FIG. 2 is merely illustrative (e.g., the unit cells may be smaller (or larger) relative to a size on the electronic device 210 and the receiver 212).

In some embodiments, a respective unit cell may have dimensions of approximately 35 mm by 35 mm. Thus, a transmitter pad that includes a 2 by 2 arrangement of unit cells may have dimensions of approximately 70 mm by 70 mm. In other embodiments, the transmitter pad may include a 3 by 3 arrangement of unit cells, and the transmitter pad may therefore have dimensions of approximately 105 mm by 105 mm. These are merely examples, and other dimensions (for both transmitter pads and individual unit cells) and arrangements of unit cells are also possible.

FIGS. 3A-3D show cross-sectional views of the transmitter pad 200 (taken along the line A-A' of FIG. 2), in accordance with some embodiments. Cross-sectional hashing has been removed from antennas 306 and feed elements 307 for clarity.

As shown in FIG. 3A, the conductive plate 204 includes a plurality of cutouts (e.g., cutout 302-A) extending through the conductive plate 204 (e.g., extending from an outer surface of the conductive plate 204 through to an inner surface of the conductive plate 204). The conductive plate 204, and in turn the plurality of cutouts, have a thickness of T1.

The transmitter pad 200 also includes an insulator 304, which is responsible, at least in part, for projecting the accumulations of energy at different distances above the conductor plate 204. The insulator 304 separates respective feeding elements 307-A and 307-B from an inner surface of the conductive plate 204. In addition, the insulator 304 is sandwiched between the conductive plate 204 and the grounding plate 308. The insulator 304 has a thickness of T2. In some embodiments, the thickness (T1) of the conductive plate 204 is greater than the thickness (T2) of the insulator 304, or vice versa. In some embodiments, the thickness (T1) of the conductive plate 204 is the same as the thickness (T2) of the insulator 304. In some embodiments, the thickness (T2) of the insulator 304 is selected based, at least in part, on the operating frequency. For example, the thickness (T2) of the insulator 304 may range from $0.03\lambda$ to $0.5\lambda$ of the operating frequency. As noted above, the transmitter pad 200 can transmit the plurality of RF power transmission signals at frequencies ranging from 400 MHz ($\lambda$=0.75 meters) to 60 GHz ($\lambda$=0.005 meters), depending on the application. Accordingly, when operating at a frequency of 400 MHz, the thickness (T2) of the insulator 304 can range from approximately 0.0225 meters (i.e., 22.5 mm) to approximately 0.375 meters (i.e., 375 mm) and when operating at a frequency of 60 GHz, the thickness (T2) of the insulator 304 can range from approximately 0.00015 meters (i.e., 0.15 mm) to approximately 0.0025 meters (i.e., 2.5 mm). One skilled in the art will appreciate that the thickness (T2) of the insulator 304 can vary from application to application and the examples provided above are simply used to provide context. Therefore, in some embodiments, the thickness (T2) of the insulator 304 can range from approximately 0.15 mm to approximately 375 mm.

The thickness (T2) of the insulator 304 may modify one or more characteristics of the accumulations of energy (e.g., height, width, degree of concentration, near-field gain, far-field gain, resonance frequency, etc.) radiating from the conductive plate 204. For example, when the insulator has a first thickness (T2'), the accumulations of energy may extend above the outer surface of the conductive plate 204 to a first height and when the insulator has a second thickness (T2"), the accumulations of energy may extend above the outer surface of the conductive plate 204 to a second height, the second height being different from the first height. Accordingly, the thickness (T2) of the insulator 304 may influence an overall efficiency of the electromagnetic fields radiating from the conductive plate 204.

In some embodiments or circumstances, the thickness of the conductive plate 204 may also be selected to influence formation of the accumulations (e.g., the thickness, T1, of the conductive plate 204 is selected to help influence (i) cancellation of parts of electromagnetic fields in the far-field region and (ii) accumulations of energy extend far enough in the near-field region above an outer surface of the conductive plate 204 to deliver power to the receiver 212).

In some embodiments, the insulator 304 is air. Alternatively, in some embodiments, the insulator 304 is a dielectric material (e.g., a polymer, a fiber reinforced polymer, glass, etc.) disposed inside the internal cavity of the housing 202. As mentioned above, the thickness (T2) of the insulator 304 can influence one or more characteristics of the accumulations of energy. In addition, using a first type of insulator over a second type of insulator may also influence one or more characteristics of the accumulations of energy. In some embodiments, the insulator 304 supports the conductive plate 204 (e.g., the conductive layer is formed on the insulating layer and the cutouts are etched from the conductive layer and through to the insulator).

The transmitter pad 200 includes a first unit cell 305-A and a second unit cell 305-B (separated by dashed line). The first unit cell 305-A includes a first feed element 307-A and the second unit cell 305-B includes a second feed element 307-B. The first and second unit cell antennas 305 may be an example of the one or more unit cell antennas 110 (FIGS. 1A-1B). As shown, the first and second feed elements 307 are separated from an inner surface of the conductive plate 204 by a distance (D). In some embodiments, however, the first and second antennas are separated from the inner surface of the conductive plate 204 by different distances. Variations in the distance (D) may modify one or more characteristics of the accumulations of energy (e.g., height, width, degree of concentration, near-field gain, control of far-field gain, etc.) radiating from the conductive plate 204. In some embodiments, to ensure proper forming of the accumulations of energy, the distance (D) is less than the thickness (T2) of the insulator 304. Furthermore, in some embodiments, the distance (D) is less than the thickness (T2) of the insulator 304 by a threshold amount. Put another way, a ratio between the distance (D) and the thickness (T2) of the insulator 304 satisfies a predefined range. For example, the predefined range may limit the ratio of (D)/(T2) from $0.05\lambda$ to $0.8\lambda$, i.e., $0.05\lambda < (D)/(T2) < 0.8\lambda$. As noted above, at least in some embodiments, the thickness (T2) of the insulator 304 can range from approximately 0.15 mm to approximately 375 mm, depending on the operating frequency of the transmitter pad 200. Accordingly, in those embodiments, the distance (D) can range from approximately 0.0075 mm (e.g., when operating at a frequency of 60 GHz) to approximately 300 mm (when operating at a frequency of 400 MHz), in light of the predefined range limiting the ratio of (D)/(T2) from $0.05\lambda$ to $0.8\lambda$.

In those embodiments having dielectric materials disposed in the internal cavity of the housing 202, the first and second feed elements 307 may be at least partially encapsulated by the dielectric material. In doing so, the first and second feed elements 307 (and the other antennas of the transmitter pad 200) are further supported, and as such, the durability of the transmitter pad 200 is increased (e.g., the insulator better absorbs impact forces, such as when the transmitter pad 200 is dropped). Additionally, interference between the first and second feed elements 307 (and other feed elements) is substantially reduced when the feed elements 307 are at least partially encapsulated by the dielectric material (i.e., the feed elements 307 are electrically isolated from one another). In light of this arrangement, an overall efficiency of the transmitter pad 200 is increased.

In some embodiments, the transmitter pad 200 includes a metal patch element 306 for each antenna element. The feed element 307 drives the corresponding patch element 306. For example, the first patch element 306-A is driven by a first feed element 307-A and the second patch element 306-B is driven by a second feed element 307-B. The feed element 307 may be made from any suitable material known by those skilled in the art (e.g., aluminum, copper, etc.).

In some embodiments, the transmitter pad 200 includes a ground or grounding layer or plate 308. In some embodiments, the grounding plate 308 forms a bottom surface of the housing 202 (FIG. 2). Alternatively, in some embodiments, the grounding plate 308 is placed on top of the bottom surface inside the housing 202. The grounding plate 308 may be formed out of the same material as the housing 202 or may be formed out of a different material. In some embodiments, the grounding plate 308 includes a hole (e.g., a via) allowing the feed element (e.g., feed element 307-A) to pass through the grounding plate 308. Alternatively, in some embodiments, the feed element does not pass through the grounding plate 308 but instead connects to the antenna element from some other direction (e.g., the side). In some embodiments, the grounding plate 308 acts as a reflector such that RF power transmission signals cannot pass through the grounding plate 308 and are reflected back towards respective cutouts of a unit cell instead.

Figure 3B:
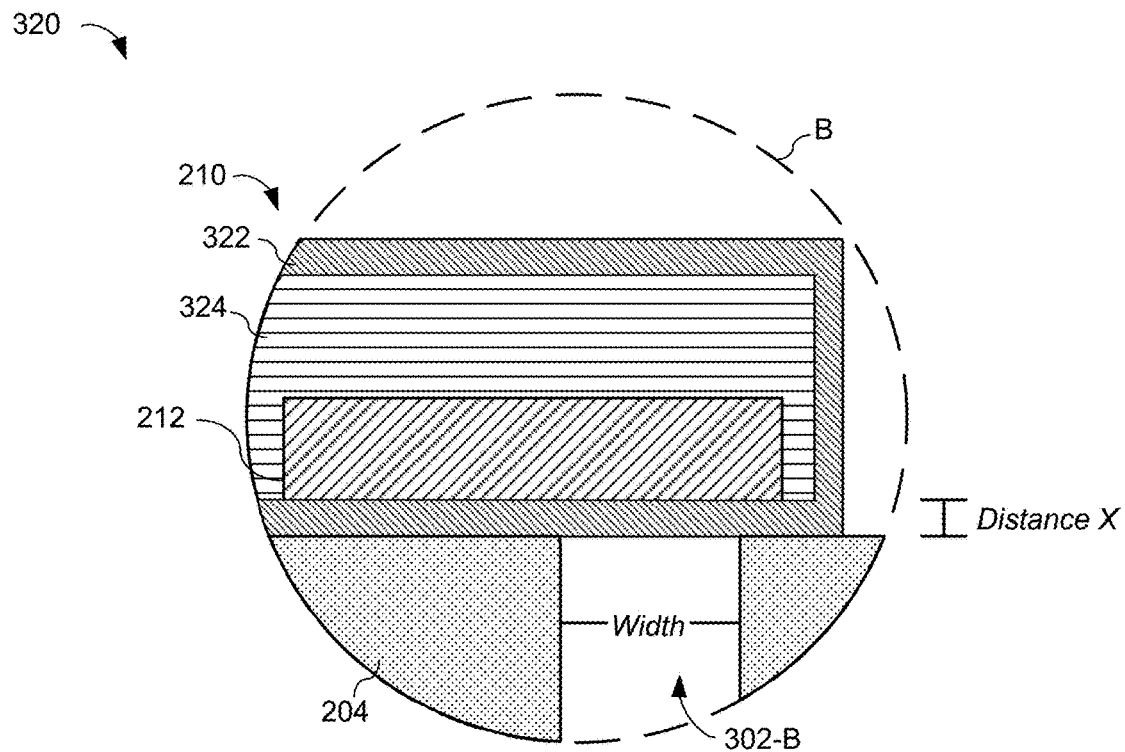

FIG. 3B is a close-up cross-sectional view of the electronic device 210 placed on the conductive surface 204. As shown, the electronic device 210, and in turn the receiver 212, are positioned over cutout 302-B (e.g., one of the plurality of cutouts in the conductive plate 204). Accordingly, when the first feed 307-A transmits a plurality of RF power transmission signals towards the inner surface of the conductive plate 204, at least some of the RF power transmission signals of the plurality of RF power transmission signals excite a current to flow around the cutout 302-B and thereby cause accumulations of electromagnetic energy to form above the cutout 302-B within a near-field distance of the conductive plate 204. The receiver 212 may then harvest energy from the accumulation of energy formed above the cutout 302-B.

The electronic device 210 includes a sidewall 322 and an internal cavity 324 housing the receiver 212. As shown, the receiver 212 is not placed directly on an outer surface of the conductive plate 204. Instead, the receiver 212 is separated from the outer surface of the conductive plate 204 by a distance "X" (i.e., a thickness of the sidewall 322). Accordingly, the transmitter pad 200 may adjust one or more characteristics (e.g., waveform characteristics, such as phase, gain, amplitude, frequency, etc.) of power waves transmitted by feed element 307-A to ensure that an accumulation of energy extends above the outer surface of the conductive plate 204 by at least the distance X. In some embodiments, the transmitter pad 200 adjusts one or more characteristics of the power waves so that the accumulation of energy extends past the distance X by a predefined amount, thereby ensuring that the receiver 212 can harvest energy from the accumulation of energy.

In some embodiments, the transmitter pad 200 adjusts the one or more characteristics of the power waves (e.g., RF power transmission signals 422, FIG. 4C) after detecting a presence of the receiver 212. The transmitter pad 200 may detect a presence of the receiver 212 using the example techniques described above.

Alternatively or in addition, in some embodiments, the transmitter pad 100 adjusts the one or more characteristics of the power waves after receiving one or more communication signals from the receiver 212. For example, data contained within the one or more communication signals may indicate that the receiver 212 is separated from the first feed 307-A by a particular distance. The transmitter pad 200 may determine the separation distance based on signal strength of the one or more communication signals, triangulation, and/or response time (e.g., receiver 212 timestamps a communication signal when sent which is then compared against a timestamp of the communication signal when it is received at the transmitter pad 200). In some embodiments, the transmitter pad 200 determines the separation distance using two or more forms of data (e.g., signal strength in combination with a thermal imaging data, or some other combination). Using the separation distance, the transmitter pad 200 may determine a thickness of the sidewall 322 of the electronic device 210 (e.g., subtract fixed distance between feed 307-A and the outer surface of conductive plate 204 from the separation distance to obtain distance "X").

In some embodiments, the transmitter pad 100 adjusts the one or more characteristics of the power waves by considering data obtained from the receiver 212, data obtained by the transmitter sensors, the set of dimensions of the cutout (s), and an arrangement of the cutouts.

FIG. 3C is another cross-sectional view 330 of the transmitter pad 200 (taken along the line A-A' of FIG. 2), in accordance with some embodiments. The electronic device 210 and the receiver 212 are not shown in FIGS. 3C-3D for ease of illustration and discussion. In addition, some other references, which are included in FIG. 3A, are not included in FIGS. 3C-3D for clarity.

In those embodiments where the transmitter pad 200 includes housing 202, the housing 202 includes four sidewalls (e.g., sidewalls 332-A, 332-B, and so on), a bottom surface 334, and an opening defined opposite the bottom surface 334. The opening is configured to receive the conductive plate 204. In other words, the conductive plate 204 is coupled to the four sidewalls of the housing 202 such that the conductive plate 204 closes the opening.

In some embodiments, the bottom surface 334 is the grounding plate 308 (FIG. 3A). Alternatively, in some embodiments, the grounding plate 308 is disposed on top of the bottom surface 334 of the housing, as discussed above. In those embodiments where the bottom surface 334 is the grounding plate 308, the bottom surface 334 includes one or more holes (e.g., vias) allowing one or more feeds (e.g., feed element 307-A) to pass through the housing 202.

In some embodiments, an antenna type may dictate a separation distance of the antenna from an inner surface of the conductive plate 204. For example, referring to FIG. 3A, the first and second feeds 307-A, 307-B are separated from the inner surface of the conductive plate 204 by a first distance (D). The first and second feed elements 307-A, 307-B may feed metal patches 306-A and 306-B, respectively (e.g., the feed and metal patches form respective antennas of a first type, patch antennas, that excite the one or more cutouts located above). Additionally, the feed elements 307-A, 307-B may feed various other antenna types (e.g., monopole, dipole, magnetic loops, multilayer parasitic-fed antennas, etc.). Now referring to FIG. 3C, first and second feed elements 336-A, 336-B are separated from the inner surface of the conductive plate 204 by a second distance (J), which is less than the first distance (D). The first and feed elements 336-A, 336-B are a second type of antenna (e.g., a monopole antenna). Accordingly, depending on the circumstances (e.g., design restrictions such as a height restriction of the transmitter pad 200), one type of antenna may be used over another type of antenna. Moreover, at least in some instances, a complimentary relationship between the one or more cutouts and the feed elements 336-A, 336-B improves performance of the transmitter pad 200. An example of the "complimentary relationship" includes a cutout defined through the conductor plate 204 paired with a patch (e.g., micro-strip printed type of feed element) (as shown in FIG. 3A). One other example includes a wire conductor on an outer surface of the conductive plate 204 surface paired with a slot style feed. It should be noted that the example above is merely illustrative and the result may be opposite, depending on the circumstances.

FIG. 3D is another cross-sectional view 340 of the transmitter pad 200 (taken along the line A-A' of FIG. 2), in accordance with some embodiments. As shown, the transmitter pad 200 may include one or more additional layers disposed on top of the conductive plate 204. In some embodiments, a first additional layer 342 is a dielectric material (e.g., a plastic layer, a glass layer, etc.) that separates the electronic device 212 from the outer surface of the conductive plate 204. Because the first additional layer 342 is a dielectric layer, it does not alter an accumulation of energy formed at a respective cutout. However, the transmitter pad 200 has to compensate for a thickness of the first additional layer 342 because a separation distance (i.e., distance "X," FIG. 3B) between the receiver 212 and the antenna is increased when the first additional layer 342 is included. In some embodiments, the first additional layer 342 acts as a "lens," meaning it increases a degree of concentration (e.g., focuses) of the accumulations of energy formed near the cutouts. Accordingly, the first additional layer 342 may improve isolation at specific locations relative to the center of the unit cell (e.g., reduce radiation to neighboring unit cells). In addition, the first additional layer 342 uniformly distributes energy across the outer surface of the conductive plate 204. As a result, gaps (i.e., "cold zones") between adjacent accumulations of energy may be minimized, or even eliminated.

In addition, in some embodiments, the transmitter pad 200 includes a second additional layer 344 disposed on top of the first additional layer 342. The second additional layer 344 may be a conductive material such as aluminum or copper. In some embodiments, the second additional layer 344 is another conductive plate, similar to the conductive plate 204. Alternatively, in some embodiments, the second additional layer 344 is deposited (e.g., printed, painted, etc.) onto the first additional layer 344. Again, the transmitter pad 200 has to compensate for a thickness of the second additional layer 344 because a separation distance (i.e., distance "X," FIG. 3B) between the receiver 212 and the antenna is increased when the second additional layer 344 is included.

In some embodiments, the second additional layer 344 alters formation of one or more accumulations of energy formed at a respective cutout. For example, the second additional layer 344 may increase a concentration and/or may adjust a position of the accumulation of energy formed at the respective cutout (i.e., may offset a position). In another example, the second additional layer 344 can be used to merge one or more portions of a first accumulation of energy with one or more portions from a second (and perhaps a third) accumulation of energy (i.e., uniformly distribute energy across the outer surface of the conductive plate 204). In this way, gaps (i.e., "cold zones") between adjacent accumulations of energy may be minimized, or even eliminated. In some instances, the second additional layer 344 further improves the benefits discussed above with regards to the first additional layer 344.

FIGS. 4A-4C show a unit cell and accumulations of energy that form at respective cutouts of the unit cell, in accordance with some embodiments. FIG. 4A is a top view of a unit cell 400 (e.g., unit cell 110-A, FIG. 1). The unit cell 400 includes a conductive plate 402 (e.g., conductive plate 204, FIG. 2) having first and second cutouts 404 (e.g., channels, slots, etc.) defined through the conductive plate 402. In addition, the unit cell 400 includes a feed element 406 (e.g., feed 307-A, FIG. 3A) located beneath the conductive plate 402 (e.g., located in an internal cavity defined by housing 202, FIG. 2). Although the feed element 406 is shown to be centered in the unit cell 400, in some embodiments, the feed element 406 is not centered (or may be centered about a first axis but not centered about a second axis). Placing the feed element 406 at different positions can influence a distribution of the accumulations of energy (e.g., a first position may create a more uniform distribution and a second position may create a more focused distribution).

As shown, each of the first and second cutouts 404 includes a plurality of portions 408 (also referred to herein as cutout portions). Portions of a respective cutout may be arranged in numerous ways. For example, the first cutout 404-A includes a first portion 408-A that is perpendicular (e.g., orthogonal) to a second portion 408-B, and a third portion 408-C that is also perpendicular to the second portion 408-B. The second cutout 404-B includes similar portions (not labeled). In another example, the first portion 408-A may be perpendicular to the second portion 408-B, and the third portion 408-C may also be perpendicular to the second portion 408-B, but may extend downwards (instead of upwards as shown in FIG. 4A). These arrangements are merely illustrative, and other arrangements are possible.

In some embodiments, a shape of the first cutout 404-A mirrors a shape of the second cutout 404-B (e.g., a horseshoe shape). In addition, the first cutout 404-A interleaves or interposes with the second cutout 404-B. This arrangement minimizes gaps between the first and second cutouts (e.g., minimized gaps between respective portions of the first and second cutouts 404), which results in gaps between adjacent accumulations of energy also being minimized. In addition, the complimentary natural of the cutouts 404 (e.g., the interlocking arrangement) also (i) minimizes far-field gain of the unit cell 400 and (ii) reduces interference with other devices positioned on other unit cells. For example, far-field electromagnetic fields from a respective portion of the cutout 404-A is at least partially cancelled out (as discussed above with reference to FIG. 2) by far-field electromagnetic fields from portions that are adjacent to the respective cutout. In addition, due to the interlocking arrangement of the first and second cutouts 404, far-field gain of electromagnetic radiation is further minimized between each of the cutouts.

In some embodiments, each of the first and second cutouts 404 has a total length that is at least as large as a wavelength of a respective RF power transmission signal transmitted by the transmitter pad (e.g., transmitted by antenna element 406). As such, at least in some embodiments, a length of each portion of the cutouts 404 is less than the wavelength of the respective RF power transmission signal transmitted by the transmitter pad. For example, the second cutout 404-A includes first, second, and third portions 408-A, 408-B, and 408-C, respectively, that each have a length of "X," which is less than the wavelength. However, when the three lengths of "X" are combined from each of the three portions, the total length of the cutout 404-A is at least as large as the wavelength. In some embodiments, the length of "X" is half (or approximately half) the wavelength of the respective RF power transmission signal transmitted by the transmitter (e.g., V2). In some embodiments, the length of "X" is some other percentage of the wavelength.

FIG. 4B is a top view 410 of the unit cell 400 showing accumulations of energy formed upon transmission of a plurality of RF power transmission signals by the feed element 406, in accordance with some embodiments. As shown, multiple accumulations of energy (e.g., accumulation of energy 412) form along a length of each cutout. The number of accumulations corresponds to the number of portions in a respective cutout. For example, the first and second cutouts 404 each include three portions (e.g., first portion 408-A, second portion 408-B, and third portion 408-C). As such, the first and second cutouts 404 each include three accumulations of energy. In light of this, any number of accumulations of energy may be created depending on a design of a respective cutout (e.g., a cutout having say, 10 perpendicular portions, facilitates creation of 10 accumulations of energy). A length of a respective portion dictates whether an accumulation of energy forms at the respective portion, and also dictates characteristics of the electromagnetic field radiating from the respective portion (e.g., an amount of energy present in the accumulation of energy).

FIG. 4C is a cross-sectional view 420 (taken along line C-C' of FIG. 4B) of the unit cell 400 during transmission of the plurality of RF power transmission signals 422 by the feed element 406, in accordance with some embodiments. As shown, transmission of the plurality of RF power transmission signals 422 by the feed element 406 causes conduction of a current along a perimeter of the cutouts 404 located above, thereby causing a plurality of NF accumulations of energy 412-A-412-D to form at the first and second cutouts 404. The plurality of accumulations of energy 412-A-412-D extends above the conductive plate 402 by a distance "Y." The distance "Y" is greater than the separation distance "X" discussed above with reference to FIG. 3B (e.g., the distance "X" concerns a distance between the receiver 212 and the outer surface of the conductive 204). Because of this, each of the plurality of accumulations of energy 412-A-412-D can reach a receiver placed on top of the conductive plate 402, thereby facilitating wireless charging of the receiver.

In some embodiments, the plurality of accumulations of energy 412-A-412-D extends approximately 1 to 5 millimeters above the outer surface of the conductive plate 402. For example, if a receiver is separated from the outer surface of the conductive plate 402 by 2 millimeters, then the plurality of accumulations of energy 412-A-412-D may extend above the outer surface of the conductive plate 402 by 2.1 to 5 millimeters. In some embodiments, a processor 104 of the transmitter pad 100 (FIG. 1A) modifies one or more characteristics of the plurality of RF power transmission signals 422 to increase (or decrease) the distance "Y." In addition, a variety of variables may be manipulated to cause formation of NF accumulations of energy at various distances from the conductive plate 402, and these variables include a thickness of the conductive plate 402, a thickness of the insulator 414 (e.g., insulator 304, FIG. 3A), a width of the cutout, a length of a portion, and the type of antenna may also increase (or decrease) the distance "Y," depending of types of devices that will be charged using a particular transmitter pad that includes a plurality of unit cells.

Figure 5A:
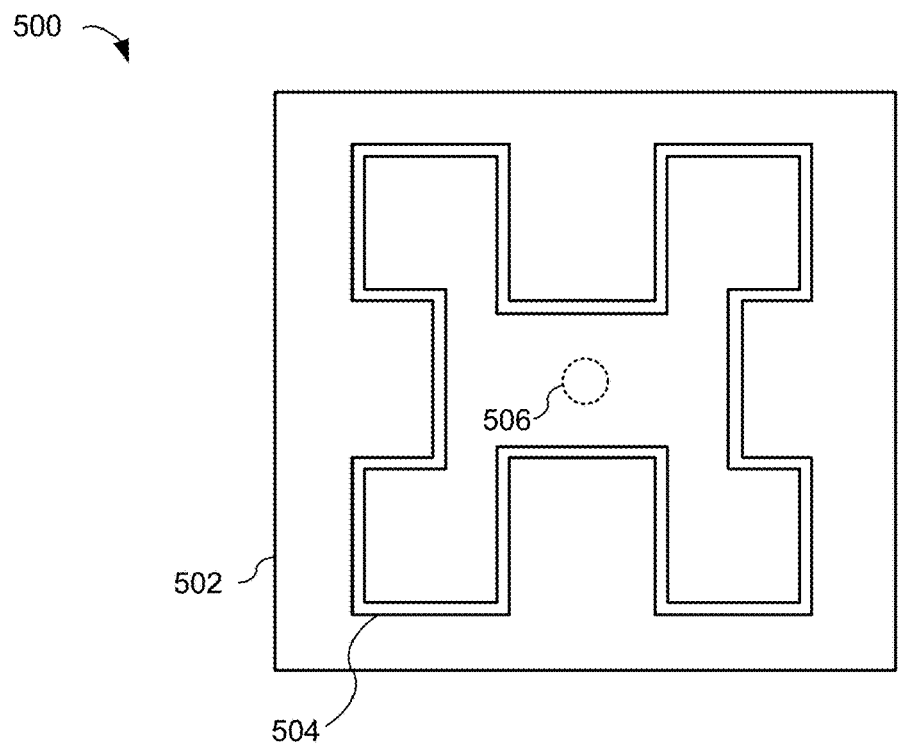
FIGS. 5A-5B show top views of a respective near-field antenna of a transmitter pad, in accordance with some embodiments.
Figure 5B:
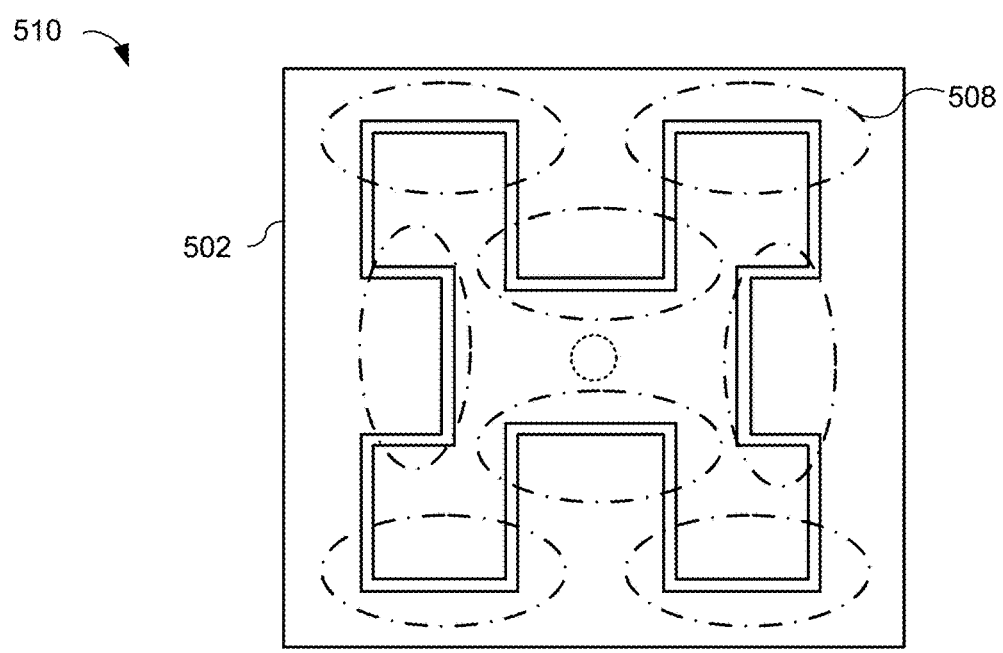

FIGS. 5A-5B show a unit cell and accumulations of energy that form at a single cutout of the unit cell, in accordance with some embodiments. FIG. 5A is a top view of a unit cell 500 (e.g., unit cell 110-A, FIG. 1B). The unit cell 500 includes a conductive plate 502 (e.g., conductive plate 204, FIG. 2) having a cutout 504 (e.g., channel/slot). The unit cell 500 includes a feed element 506 (e.g., feed element 307-A, FIG. 3A) located beneath the conductive plate 502 (e.g., located in an internal cavity defined by housing 202, FIG. 2). Although the feed element 506 is shown to be centered in the unit cell 500, in some embodiments, the feed 506 is not centered (or may be centered about a first axis but not a second axis).

In some embodiments, the cutout 504 has a total length that is at least as large as a wavelength of a respective RF power transmission signal transmitted by the transmitter (e.g., transmitted by antenna element 506). In addition, the cutout 504 includes a plurality of portions (e.g., each vertical and horizontal section of the cutout 504). In some embodiments, a length for each portion of the cutout 504 is less than a wavelength of the respective RF power transmission signal transmitted by the transmitter pad (e.g., transmitter pad 200, FIG. 2). In some embodiments, a length of each of the plurality of portions is the same (e.g., $\lambda/2$). Alternatively, in some embodiments, a first set of portions of the plurality of portions has a first length and a second set of portions of the plurality of portions has a second length, the second length being greater than the first length. In some embodiments, the first length is a length that facilitates creation of accumulations of energy (e.g., $\lambda/2$) and the second length is a length that does not facilitate creation of accumulations of energy (e.g., $\lambda$).

FIG. 5B is a top view 510 of the unit cell 500 showing accumulations of energy formed after transmission of a plurality of RF power transmission signals by the antenna element 506, in accordance with some embodiments. Each of the plurality of accumulations of energy (e.g., accumulation of energy 508) forms along a portion of the cutout 504. In some embodiments, each respective portion of the cutout 504 has a corresponding accumulation of energy formed at the respective portion. Alternatively, in some embodiments, one or more portions of the cutouts 504 lack a corresponding accumulation of energy formed at the respective portion (e.g., when a length of the respective portion does not facilitate creation of an accumulation of energy).

FIG. 6 is a flow diagram showing a method of wireless power transmission for forming one or more accumulations of RF energy at a near-field distance with minimal far-field gain, in accordance with some embodiments. Operations (e.g., steps) of the method 600 may be performed by a near-field charging pad (e.g., transmitter pad 100, FIGS. 1A-1B; transmitter pad 200, FIG. 2) or by one or more components thereof (e.g., an RF power transmission signals generation module, a characteristic selection module, and/or a beacon transmitting module). At least some of the operations shown in FIG. 6 correspond to instructions stored in a computer memory or computer-readable storage medium (e.g., memory 106 of the transmitter pad 100, FIG. 1A).

The method 600 includes providing (602) a near-field antenna (e.g., unit cell 400, FIG. 4; unit cell 500, FIG. 5) that includes a conductive plate (e.g., conductive plate 204, FIG. 2) having (i) first and second opposing planar surfaces (e.g., an inner surface and an outer surface) and (ii) one or more cutouts (e.g., cutouts 404-A and 404-B, FIG. 4; cutout 504, FIG. 5A) extending through the conductive plate from the first surface to the second surface. The near-field antenna further includes a feed element (e.g., feed element 307, FIG. 3A) separated from the first surface of the conductive plate via an insulator (e.g., insulator 304, FIG. 3A). In some embodiments, the feed element is at least a component of a patch antenna, where the insulator is disposed between the feed element and the conductive plate. Alternatively, in some embodiments, the feed element is a component of a patch antenna that is at least partially encapsulated within the insulator. In some embodiments, the conductive plate is a plate specific to the unit cell (i.e., a distinct and separate plate). Alternatively, in some embodiments, the conductive plate extends to one or more adjacent unit cells.

In some embodiments, the near-field antenna further includes another insulator that separates the feed element from a grounding plate (e.g., grounding 308, FIG. 3A). Alternatively, in some embodiments, the insulator separates the feed element from the grounding plate.

In some embodiments, the conductive plate is a conductive layer deposited on a surface of the insulator (e.g., the insulator is a rigid polymer substrate and the conductive layer is deposited thereon). Alternatively, in some embodiments, the insulator is a dielectric layer that is deposited on the first surface of the conductive plate.

In some embodiments, the insulator is selected from the group consisting of: a polymer, a fiber reinforced polymer, glass, and air. In some embodiments, a thickness of the insulator is greater than a thickness of the conductive plate, or vice versa.

In some embodiments, a first cutout of the one or more cutouts forms a first meandering line pattern and a second cutout of the one or more cutouts forms a second meandering line pattern. In some embodiments, the first and second meandering line patterns are the same meandering line pattern (i.e., a shape of the first meandering line pattern mirrors a shape of the second meandering line pattern). For example, referring to FIG. 4A, a first cutout 404-A forms the first meandering line pattern and the second cutout 404-B forms the second meandering line pattern. Alternatively, in some embodiments, the first and second meandering line patterns are different meandering line patterns. In some embodiments, a line pattern is considered a meandering line pattern when the line pattern includes at least one direction change. In some embodiments, the at least one direction change is a perpendicular direction change. Alternatively, in some embodiments, the at least one direction change is some other angular direction change. One skilled in the art will appreciate that the line patterns in FIGS. 4 and 5 are non-limiting examples, and other meandering line patterns may be implemented.

In some embodiments, the first meandering line pattern is rotated with respect to the second meandering line pattern (e.g., rotated 180 degrees). Put another way, a shape of the first meandering line pattern may be disposed in a first direction and a shape of the second meandering line pattern may be disposed in a second direction, which is opposite to the first direction. For example, as shown in FIG. 4A, the first cutout 404-A (i.e., the first meandering line pattern) interlocks with the second cutout 404-B (i.e., the second meandering line pattern) because the two cutouts are disposed in opposing directions.

The method 600 further includes causing (604) the feed element to direct a plurality of RF power transmission signals (e.g., RF power transmission signals 422, FIG. 4C) towards the conductive plate (e.g., towards an inner surface of the conductive plate 204, FIG. 2). In some embodiments, the plurality of RF power transmission signals is transmitted at a frequency selected from the group consisting of: 5.8 GHz, 2.4 GHz, and 900 MHz.

In some embodiments, prior to causing the feed element to direct the plurality of RF power transmission signals towards the conductive plate, the transmitter pad 200 detects a receiver on the conductive plate (e.g., a user places an electronic device 210, which houses the receiver 212, on an outer surface of the conductive plate 204, thereby putting the receiver within a threshold distance of the wireless charging region 206-A, FIG. 2). In some embodiments, the feed element receives the one or more RF power transmission signals from a power amplifier in response to determining that a receiver is placed within the threshold distance of the outer surface. In some embodiments, the threshold distance is a predetermined threshold distance (e.g., the predetermined threshold distance is stored in memory 106 of the transmitter pad 100, FIG. 1A).

In some embodiments, the transmitter pad 200 detects the receiver using one or more sensors (e.g., transmitter sensors 114, FIG. 1A). Alternatively or in addition, in some embodiments, the transmitter pad 200 detects the receiver by receiving (or exchanging) one or more communication signals from (or with) the receiver (e.g., receiving the one or more communication signals via the communications component(s) 112, FIG. 1A). For example, a signal strength level associated with the one or more communication signals received by a processor 104 (FIG. 1A) connected to the near-field antenna may indicate that the receiver is within the threshold distance of the outer surface. Detecting the receiver is discussed in further detail above with reference to FIGS. 2 and 3A-3B.

The method 600 further includes receiving (606), at the conductive plate, the plurality of RF power transmission signals from the feed element. In some embodiments, receiving the plurality of RF power transmission signals from the feed element causes a current to flow (e.g., current flow 209, FIG. 2) along an edge/perimeter of the conductive plate defined by the one or more cutouts.

The method 600 further includes radiating (608), through the one or more cutouts, at least some of the plurality of RF power transmission signals so that RF energy from the plurality of RF power transmission signals accumulates within a near-field distance of the conductive plate to create at least two distinct zones of accumulated RF energy (e.g., accumulations of energy 412-A-412-D, FIG. 4C) at each of the one or more cutouts. The at least two distinct zones of accumulated RF energy at each of the one or more cutouts are defined based, at least in part, on (i) a set of dimensions defining each of the one or more cutouts and (ii) an arrangement of the one or more cutouts. For example, the set of dimensions defining each of the one or more cutouts may include: a thickness of the conductive plate, a width of the cutout, a shape of the cutout, a length of the cutout, and a number of portions (e.g., segments) of the cutout. The arrangement of the one or more cutouts minimizes gaps between adjacent zones of accumulated RF energy. In addition, depending on the arrangement, one or more adjacent zones of accumulated RF energy may substantially merge, thereby eliminating gaps between the zones of accumulated RF energy.

In some embodiments, the at least two distinct zones cover at least 80% of a surface area of the second surface of the conductive plate. Alternatively, in some embodiments, the at least two distinct zones cover at least 90% of the surface area of the second surface of the conductive plate. A degree of coverage of the surface area is based, at least in part, on (i) the set of dimensions defining each of the one or more cutouts and (ii) the arrangement of the one or more cutouts (e.g., arrangement in a given unit cell and also an arrangement of cutouts between adjacent unit cells).

In some embodiments, a respective cutout of the one or more cutouts has a respective length that is at least as large as a wavelength of a respective RF power transmission signal of the plurality of RF power transmission signals. Such a configuration promotes formation of the at least two distinct zones of accumulated RF energy along the length of the respective cutout, as discussed above with reference to FIGS. 4 and 5.

Furthermore, in some embodiments, the respective cutout includes, at least, a first portion defined in a first direction (e.g., first portion 408-A, FIG. 4A) and a second portion (e.g., second portion 408-B, FIG. 4A) defined in a second direction, the second direction being orthogonal to the first direction. Moreover, a first of the at least two distinct zones of accumulated RF energy is created at the first portion and a second of the at least two distinct zones of accumulated RF energy is created at the second portion.

In some embodiments, the respective cutout further includes a third portion defined in the first direction (e.g., third portion 408-C, FIG. 4A) or some other direction. In some embodiments, the third portion mirrors the first portion, such that the respective cutout forms a horseshoe shape. Alternatively, in some embodiments, the third portion extends away from the first and second portions, such that the respective cutout forms an "S" shape. In some embodiments, a third distinct zone of accumulated RF energy is created at the third portion. The respective cutout may further include additional portions defined in various directions.

In some embodiments, the at least two distinct zones of accumulated RF energy extend no more than 5 millimeters above the second surface of the conductive plate (or some greater (or lesser) amount). In this way, far-field gain of the near-field charging pad is controlled and potential interference with other devices (or other metallic objects) located in proximity to the near-field charging pad is significantly reduced, and in some circumstances, completely eliminated.

In some embodiments, the near-field antenna is a first near-field antenna (e.g., a unit cell associated with wireless charging region 206-A, FIG. 2) and is part of a near-field charging pad (e.g., transmitter pad 200, FIG. 2) that also includes, at least, a second near-field antenna (e.g., a unit cell associated with wireless charging region 206-B, FIG. 2) that is positioned adjacent to the first near-field antenna within the near-field charging pad. In addition, respective cutouts associated with the second near-field antenna are rotated relative to the one or more cutouts associated with the first near-field antenna. For example, the second near-field antenna (e.g., a unit cell associated with wireless charging region 206-B, FIG. 2) may be rotated (e.g., 90 degrees) relative to the first near-field antenna (e.g., a unit cell associated with wireless charging region 206-A, FIG. 2), or vice versa. Rotating adjacent unit cells, and in turn the cutouts defined therein, helps to further increase control over far-field gain, and ensure that the far-field gain is substantially reduced for the near-field charging pad as a whole. In addition, gaps between adjacent accumulations of energy (e.g., unit cell to unit cell) are also minimized (e.g., eliminating "cold zones" on the near-field charging pad).

Figure 7:
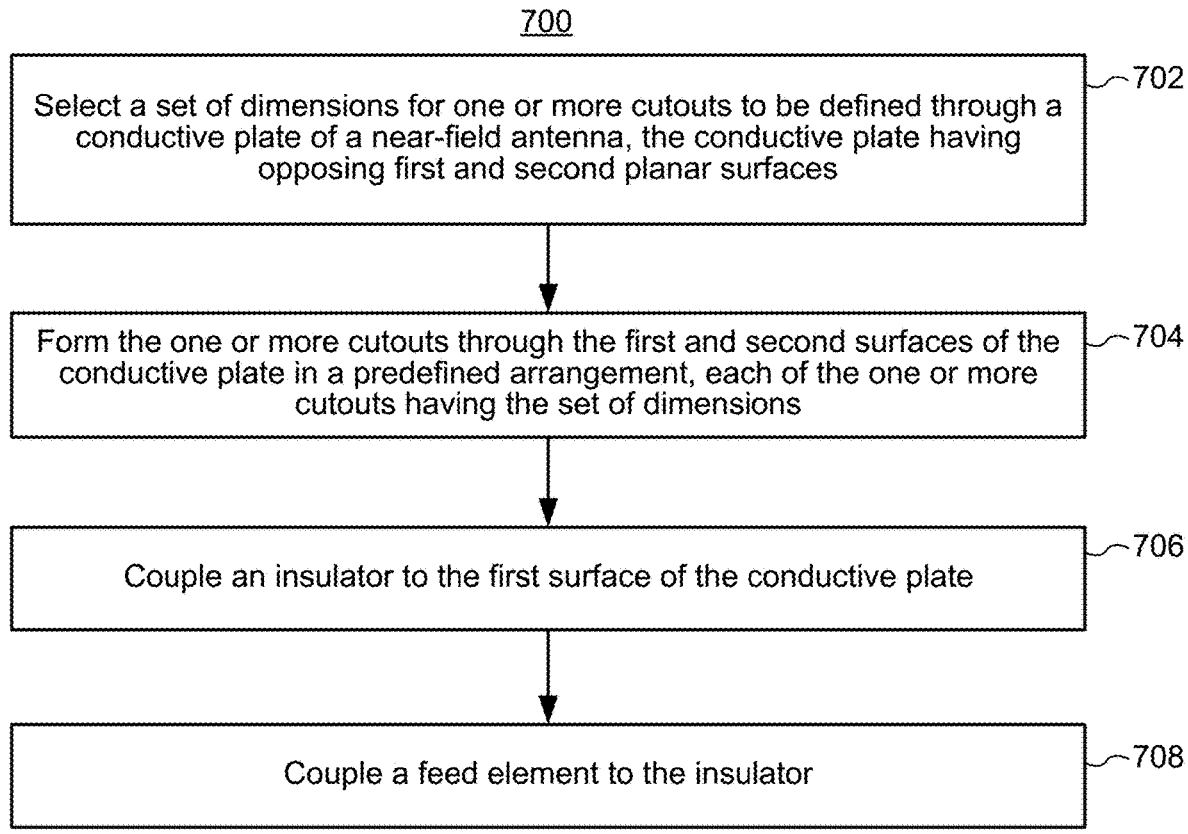
FIG. 7 is a flow diagram showing a method of fabricating a near-field antenna, in accordance with some embodiments.

FIG. 7 is a flow diagram showing a method of fabricating a near-field antenna, in accordance with some embodiments. The near-field antenna may be an example of a single unit cell (e.g., unit cell 110-A, FIG. 1; unit cell 400, FIG. 4; etc.).

The method 700 includes selecting (702) a set of dimensions for one or more cutouts (e.g., cutouts 404-A and 404-B, FIG. 4A) to be defined through a conductive plate (e.g., conductive plate 402, FIG. 4A) of the near-field antenna, the conductive plate having opposing first (e.g., an inner) and second (e.g., an outer) planar surfaces. Dimensions for the one or more cutouts are discussed in further detail above.

The method 700 further includes forming (704) the one or more cutouts through the first and second surfaces of the conductive plate in a predefined arrangement (e.g., in an interlocking arrangement as shown in FIG. 4A), each of the one or more cutouts having the set of dimensions. In some embodiments, forming the one or more cutouts includes milling (e.g., CNC milling) the one or more cutouts, laser etching the one or more cutouts, chemically etching the one or more cutouts, or some other method known by those skilled in the art. It should be noted that a cutout itself may be formed in a "predefined arrangement," e.g., the cutout 504 is formed in a predefined arrangement (FIG. 5).

The method 700 further includes coupling (706) an insulator (e.g., insulator 304, FIG. 3A) to the first surface (e.g., the inner surface) of the conductive plate. The insulator may be mechanically and/or chemically (e.g., using an adhesive) fastened to the first surface of the conductive plate. In some embodiments, the insulator supports one or more regions of the conductive plate.

In some embodiments, the insulator is coupled to the first surface (e.g., the inner surface) of the conductive plate prior to forming the one or more cutouts through the conductive plate (or the insulator is deposited on the first surface of the conductive plate prior to forming the one or more cutouts). As such, in these embodiments, forming (704) the one or more cutouts through the conductive plate includes, e.g., milling through the outer surface of the conductive plate to a surface of the insulator coupled to the inner surface of the conductive plate.

The method 700 further includes coupling (708) a feed element to the insulator. In some embodiments, the feed element is mechanically and/or chemically (e.g., using an adhesive) fastened to the insulator. Alternatively or in addition, in some embodiments, the feed element is embedded, at least partially, within the insulator. It should be noted that step 708 may be skipped in those embodiments where the insulator is air. In these embodiments, the feed element may be coupled to some other structure of the near-field antenna (e.g., a portion of the housing 202, FIG. 2).

In some embodiments, the insulator is a first insulator, and the method further includes coupling a second insulator to the feed element. For example, the first insulator may be coupled to a top portion of the feed element and the second insulator may be coupled to a bottom portion of the feed element. In this way, a sandwich structure is formed between the first insulator, the feed element, and the second insulator. The feed element may be mechanically and/or chemically (e.g., using an adhesive) fastened to the second insulator.

Alternatively or in addition, in some embodiments, the feed element is embedded, at least partially, within the second insulator.

As discussed above, the feed element is configured to direct a plurality of RF power transmission signals towards the conductive plate and at least some of the RF power transmission signals of the plurality of RF power transmission signals radiate through the one or more cutouts and accumulate within a near-field distance of the conductive surface to create at least two distinct zones of accumulated RF energy at each of the one or more cutouts. The at least two distinct zones of accumulated RF energy at each of the one or more cutouts are defined based, at least in part, on (i) a set of dimensions defining each of the one or more cutouts and (ii) an arrangement of the one or more cutouts. Forming the accumulations of energy is discussed in further detail above with reference to FIGS. 2-5B.

In some embodiments, the steps of the method 700 may be repeated such that additional near-field antennas are fabricated. In addition, in some embodiments, the method 700 further includes forming an array of near-field antennas (e.g., an array of unit cell antennas 110-A-110-N, as shown in FIG. 1B). Moreover, in some embodiments, the conductive plate is a continuous plate associated with each near-field antenna in the array of near-field antennas. Alternatively, in some embodiments, each near-field antenna includes a distinct conductive plate.

The array of near-field antennas may be interconnected via busing (e.g., communication bus 108, FIG. 1A) and may further be connected to one or more processors (e.g., processor(s) 104 of transmitter pad 100, FIG. 1A).

In some embodiments, the array of near-field antennas is disposed in a housing (e.g., housing 202, FIG. 2). In this way, leakage of RF power transmission signals (e.g., via sidewalls) in substantially reduced, and even eliminated.

Figure 8:
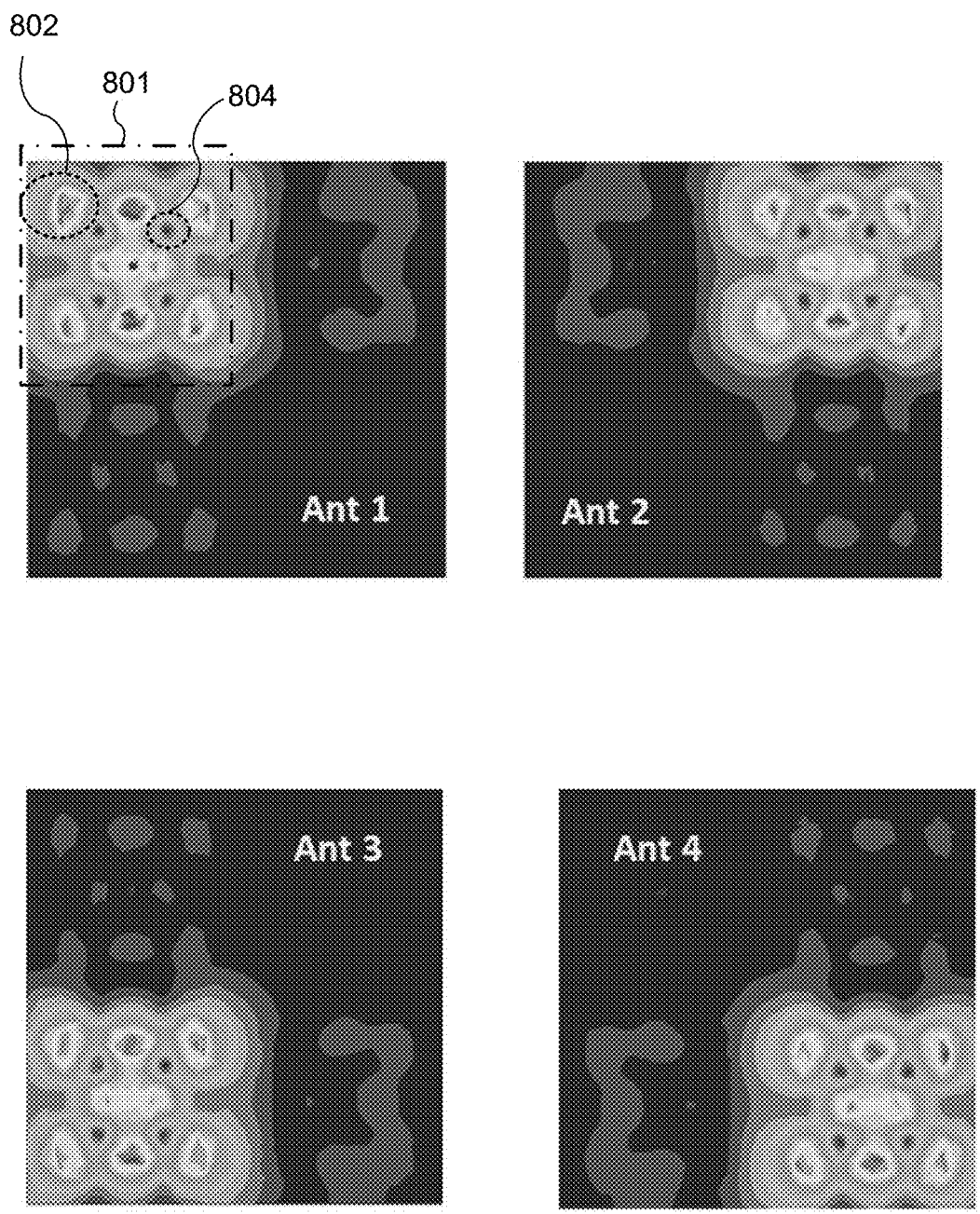
FIG. 8 shows various power distributions (e.g., accumulations of energy) formed on a transmitter pad, in accordance with some embodiments.

FIG. 8 shows various power distributions (e.g., accumulations of energy) formed on a transmitter pad, in accordance with some embodiments. In particular, FIG. 8 shows concentrations of accumulations of energy 802 on a transmitter pad (e.g., transmitter pad 100, FIGS. 1A-1B) having four unit cells (e.g., unit cell 400, FIG. 4A, unit cell 500, FIG. 5A), and each unit cell is being sequentially activated (e.g., activated meaning a feed element for a unit cell starts transmitting RF power transmission signals). As shown, the accumulations of energy 802 substantially cover a surface area of the unit cell 801. In addition, the surface area of the unit cell 801 has minimal cold zones 804. This results from, as discussed above, the set of dimensions defining each of the one or more cutouts and an arrangement of the one or more cutouts.

Also, the accumulations of energy 802 are substantially limited to the currently activated unit cell (i.e., electromagnetic radiation created at unit cell 801 does not substantially radiate to neighboring unit cells). The results from the controlled far-field gain and from the unit cells being substantially isolated relative to each other being minimized. Accordingly, objects on neighboring unit cells are not affected by radiation emitted from the currently activated unit cell 801, nor is an accumulation of energy at a particular unit cell impacted by metal objects that may be placed near to the particular unit cell.

Figure 9:
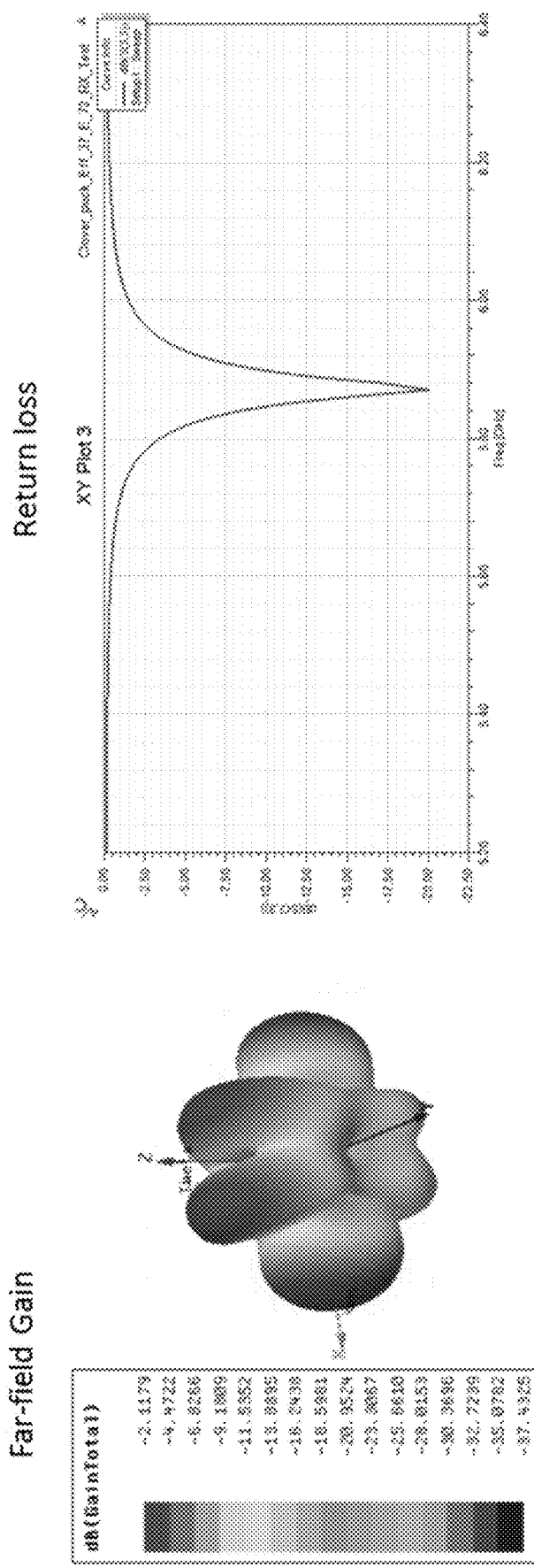
FIG. 9 is a graph that shows an example radiation pattern for a unit cell antenna that includes one or more cutouts.

FIG. 9 is a graph that shows an example radiation pattern for a unit cell antenna that includes one or more cutouts, as compared to a radiation pattern for an isotropic antenna that radiates uniformly in all directions. In particular, FIG. 9 shows that the radiation pattern for the unit cell antenna extends above a surface of the unit cell antenna in the near-field range (e.g., 1-5 millimeters) and that far-field gain is minimized and controlled to avoid any potential interference with other electronic devices operating (or other metal objects positioned) near the transmitter pad 100 (which includes a plurality of the unit cell antennas 110).

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A near-field antenna for transmitting radio frequency (RF) power transmission signals, comprising:
　　a conductive plate including one or more channels extending through the conductive plate, a respective channel of the one or more channels includes a first segment and a second segment distinct from the first segment; and
　　a feed element configured to direct a plurality of RF power transmission signals towards the conductive plate,
　　wherein:
　　　　at least some of the RF power transmission signals of the plurality of RF power transmission signals cause an accumulation of RF energy within a near-field distance of the conductive plate, the accumulation of RF energy including:
　　　　　　a first zone of accumulated RF energy at the first segment of the respective channel; and
　　　　　　a second zone of accumulated RF energy at the second segment of the respective channel, the second zone of accumulated RF energy being distinct from the first zone of accumulated RF energy.

2. The near-field antenna of claim 1, wherein the first zone of accumulated RF energy and the second zone of accumulated RF energy are within a near-field distance of the conductive plate; and the first zone of accumulated RF energy and the second zone of accumulated RF energy are configured to be provided to a receiver that is positioned near or on top of a wireless-power-transmitting device that includes the near-field antenna comprising the conductive plate.

3. The near-field antenna of claim 2, wherein the receiver is configured to harvest energy from at least one of the first zone of accumulated RF energy at the first segment of the respective channel and the second zone of accumulated RF energy at the second segment of the respective channel.

4. The near-field antenna of claim 2, wherein the first zone of accumulated RF energy and the second zone of accumulated RF energy within the near-field distance of the conductive plate facilitate a wireless charging region proximate to an area of the conductive plate.

5. The near-field antenna of claim 1, wherein the first zone of accumulated RF energy and second zone of accumulated RF energy are configured to extend approximately 1 to 5 millimeters above the conductive plate.

6. The near-field antenna of claim 1, wherein one or more characteristics of the first zone of accumulated RF energy at the first segment of the respective channel, depend, at least in part, on a set of dimensions defining the first segment of the respective channel; and one or more characteristics of the second zone of accumulated RF energy at a second segment of the respective channel, depend, at least in part, on a set of dimensions defining the second segment of the respective channel.

7. The near-field antenna of claim 1, wherein the first zone of accumulated RF energy at the first segment of the respective channel covers a first amount of surface area associated with a wireless charging area; and the second zone of accumulated RF energy at the second segment of the respective channel covers a second amount of surface area associated with the wireless charging area.

8. The near-field antenna of claim 7, wherein the second amount of surface area is distinct from the first amount.

9. The near-field antenna of claim 1, including:

an insulator separating the feed element and the conductive plate, wherein a thickness of the insulator influences the distance the first zone of accumulated RF energy accumulates above the conductive plate.

10. The near-field antenna of claim 9, wherein the thickness of the insulator is determined based on an operating frequency of the near-field antenna.

11. The near-field antenna of claim 10, wherein a thickness of the conductive plate is equal to or greater than the thickness of the insulator.

12. The near-field antenna of claim 1, wherein a thickness of the conductive plate is selected to influence formation of at least one of the first zone of accumulated RF energy and the second zone of accumulated RF energy.

13. The near-field antenna of claim 1, wherein placement of the feed element at a certain position with respect to the conductive plate is selected to influence formation of at least one of the first zone of accumulated RF energy or the second zone of accumulated RF energy.

14. The near-field antenna of claim 1, wherein:

the respective channel of the one or more channels is a first channel of the near-field antenna;

the one or more channels also include a second channel that is distinct from the first channel, respective segments of the second channel are interleaved or interposed with respective segments of the first channel across a planar surface of the conductive plate, such that gaps in adjacent accumulations of energy near the first and second channels are minimized.

15. A wireless-power-transmitting device comprising:

a near-field antenna that includes:

a conductive plate including one or more channels extending through the conductive plate, a respective channel of the one or more channels includes a first segment and a second segment distinct from the first segment;

a feed element configured to direct a plurality of RF power transmission signals towards the conductive plate; and one or more processors configured to cause the plurality of RF power transmission signals to be provided to the feed element, wherein:

at least some of the RF power transmission signals of the plurality of RF power transmission signals cause an accumulation of RF energy within a near-field distance of the conductive plate, the accumulation of RF energy including:

a first zone of accumulated RF energy at the first segment of the respective channel; and a second zone of accumulated RF energy at the second segment of the respective channel, the second zone of accumulated RF energy being distinct from the first zone of accumulated RF energy.

16. The wireless-power-transmitting device of claim 15, wherein the first zone of accumulated RF energy and the second zone of accumulated RF energy are within a near-field distance of the conductive plate; and the first zone of accumulated RF energy and the second zone of accumulated RF energy are configured to be provided to a receiver that is positioned near or on top of a wireless-power- transmitting device that includes the near-field antenna comprising the conductive plate.

17. The wireless-power-transmitting device of claim 16, wherein the receiver is configured to harvest energy from at least one of the first zone of accumulated RF energy at the first segment of the respective channel and the second zone of accumulated RF energy at the second segment of the respective channel.

18. The wireless-power-transmitting device of claim 16, wherein the first zone of accumulated RF energy and the second zone of accumulated RF energy within the near-field distance of the conductive plate facilitate a wireless charging region proximate to an area of the conductive plate.

19. The wireless-power-transmitting device of claim 15, wherein the first zone of accumulated RF energy and second zone of accumulated RF energy are configured to extend approximately 1 to 5 millimeters above the conductive plate.

20. The wireless-power-transmitting device of claim 15, wherein one or more characteristics of the first zone of accumulated RF energy at the first segment of the respective channel, depend, at least in part, on a set of dimensions defining the first segment of the respective channel; and one or more characteristics of the second zone of accumulated RF energy at a second segment of the respective channel, depend, at least in part, on a set of dimensions defining the second segment of the respective channel.

21. The wireless-power-transmitting device of claim 15, wherein the first zone of accumulated RF energy at the first segment of the respective channel covers a first amount of surface area associated with a wireless charging area; and
   the second zone of accumulated RF energy at the second segment of the respective channel covers a second amount of surface area associated with the wireless charging area.

22. The wireless-power-transmitting device of claim 21, wherein the second amount of surface area is distinct from the first amount.

23. The wireless-power-transmitting device of claim 15, including:
   an insulator separating the feed element and the conductive plate, wherein a thickness of the insulator influences the distance the first zone of accumulated RF energy accumulates above the conductive plate.

24. The wireless-power-transmitting device of claim 23, wherein the thickness of the insulator is determined based on an operating frequency of the near-field antenna.

25. The wireless-power-transmitting device of claim 15, wherein a thickness of the conductive plate is selected to influence formation of at least one of the first zone of accumulated RF energy and the second zone of accumulated RF energy.

26. The wireless-power-transmitting device of claim 24, wherein a thickness of the conductive plate is equal to or greater than the thickness of the insulator.

27. The wireless-power-transmitting device of claim 15, wherein placement of the feed element at a certain position with respect to the conductive plate is selected to influence formation of at least one of the first zone of accumulated RF energy or the second zone of accumulated RF energy.

28. The wireless-power-transmitting device of claim 15, wherein:
   the respective channel of the one or more channels is a first channel of the near-field antenna;
   the one or more channels also include a second channel that is distinct from the first channel, respective segments of the second channel are interleaved or interposed with respective segments of the first channel across a planar surface of the conductive plate, such that gaps in adjacent accumulations of energy near the first and second channels are minimized.

* * * * *